United States Patent
McAndrews

(10) Patent No.: US 7,690,666 B2
(45) Date of Patent: Apr. 6, 2010

(54) POSITION SENSITIVE SHOCK ABSORBER

(75) Inventor: Michael McAndrews, Capitola, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 333 days.

(21) Appl. No.: 11/500,036

(22) Filed: Aug. 7, 2006

(65) Prior Publication Data

US 2007/0080515 A1    Apr. 12, 2007

Related U.S. Application Data

(60) Provisional application No. 60/709,206, filed on Aug. 18, 2005.

(51) Int. Cl.
*B62K 3/02* (2006.01)
*F16F 9/34* (2006.01)

(52) U.S. Cl. .................... 280/284; 280/285; 280/276; 188/275

(58) Field of Classification Search ................ 280/284, 280/285, 276; 188/275
See application file for complete search history.

(56) References Cited

U.S. PATENT DOCUMENTS

| | | | |
|---|---|---|---|
| 1,492,328 A | 4/1924 | Lang | |
| 3,127,958 A | 4/1964 | Szostak | |
| 3,892,298 A | 7/1975 | Blatt | |
| 4,126,302 A | 11/1978 | Curnutt | |
| 4,214,737 A | 7/1980 | Blatt | |
| 4,899,853 A | 2/1990 | Hummel | |
| 5,368,141 A | 11/1994 | Clarke | |
| 5,598,903 A | 2/1997 | Richardson | |
| 5,810,128 A | 9/1998 | Eriksson et al. | |
| 5,833,036 A | 11/1998 | Gillespie | |
| 5,908,200 A * | 6/1999 | Stewart | 280/276 |
| 6,105,987 A | 8/2000 | Turner | |
| 6,244,397 B1 | 6/2001 | Kars | |
| 6,260,870 B1 * | 7/2001 | Fan | 280/276 |
| 6,267,400 B1 * | 7/2001 | McAndrews | 280/285 |
| 6,412,803 B1 * | 7/2002 | Lalikyan et al. | 280/276 |
| 6,446,771 B1 | 9/2002 | Sintorn et al. | |
| 6,581,948 B2 | 6/2003 | Fox | |
| 6,604,751 B2 | 8/2003 | Fox | |

(Continued)

FOREIGN PATENT DOCUMENTS

EP    1 352 822 A2    10/2003

(Continued)

OTHER PUBLICATIONS

Dec. 4, 2006 European Search Report for App. No. 06090138.6-2424.

*Primary Examiner*—Faye M. Fleming
*Assistant Examiner*—Marlon A Arce
(74) *Attorney, Agent, or Firm*—Knobbe, Martens, Olson & Bear, LLP

(57) ABSTRACT

A shock absorber includes a tube and a piston rod carrying a piston. The piston is configured for reciprocal movement within the tube. A floating piston, or other type of accumulator, is configured to move to accommodate fluid displaced due to successive portions of the piston rod entering the tube during compression of the shock absorber. The shock absorber includes a valve mechanism that utilizes the movement of the floating piston to move the valve between a first and second position, which preferably are open and closed positions.

34 Claims, 14 Drawing Sheets

U.S. PATENT DOCUMENTS

| | | | | |
|---|---|---|---|---|
| 6,918,605 B2 * | 7/2005 | Wada et al. | ................. | 280/279 |
| 7,163,222 B2 * | 1/2007 | Becker et al. | ............... | 280/276 |
| 7,273,137 B2 * | 9/2007 | Fox | ........................... | 188/275 |
| 2003/0213662 A1 | 11/2003 | Fox | | |

FOREIGN PATENT DOCUMENTS

| | | |
|---|---|---|
| WO | WO 98/14718 | 4/1998 |
| WO | WO 02/095260 A | 11/2002 |
| WO | WO 2004/079222 A2 | 9/2004 |

* cited by examiner

POSITION SENSITIVE SHOCK ABSORBER

CROSS-REFERENCE TO RELATED APPLICATIONS

This application is related to, and claims priority from, U.S. Provisional Patent Application No. 60/709,206, filed Aug. 18, 2005.

INCORPORATION BY REFERENCE

The entirety of U.S. Provisional Patent Application No. 60/709,206, filed Aug. 18, 2005, is expressly incorporated by reference herein and made a part of the present specification.

BACKGROUND OF THE INVENTION

1. Field of the Invention

The present invention generally relates to vehicle suspension systems. More specifically, the present invention relates to an improved shock absorber system to be incorporated into the suspension system of a vehicle, such as a bicycle.

2. Description of the Related Art

Bicycles intended for off-road use, i.e., mountain bikes, commonly include a suspension assembly operably positioned between the front and/or rear wheels of the bicycle and the frame of the bicycle. The suspension assembly typically includes a shock absorber configured to absorb forces imparted to the bicycle by bumps or other irregularities of the surface on which the bicycle is being ridden. However, an undesirable consequence of incorporating a suspension assembly in a bicycle is the tendency for the shock absorber to absorb a portion of the power output of a rider of the bicycle. In some instances, i.e. when the rider is standing, the proportion of power absorbed by the shock absorber may be substantial and may drastically reduce the efficiency of the bicycle.

Numerous attempts have been made to overcome the inefficiencies related to the use of shock absorbers in connection with mountain bikes. For example, suspension may be provided only between the front wheel and the frame of the bicycle (referred to as a "hardtail" bicycle), to take advantage of the improved handling provided by the suspension while minimizing power loss by rigidly supporting the rear wheel. However, such an arrangement reduces comfort and more importantly control for the rider.

Another proposed solution is to configure the shock absorber to differentiate forces induced by the terrain and forces induced by the rider so that terrain-induced forces may be absorbed, while the absorption of rider-induced forces is reduced or substantially eliminated. One example of this type of shock absorber utilizes an inertia valve to distinguish rider-induced forces from terrain-induced forces and is described in U.S. Pat. No. 6,267,400, which is assigned to the assignee of the present invention. In one exemplary embodiment described therein, a shock absorber includes a compression fluid chamber and a reservoir fluid chamber configured for fluid communication with the compression fluid chamber. During compression motion of the shock absorber, fluid is transferred from the compression fluid chamber to the reservoir fluid chamber, which operates as a compensation chamber for fluid displaced by a shaft of the shock absorber during compression movement, as will be readily appreciated by one of skill in the art. In an illustrated embodiment of U.S. Pat. No. 6,267,400, an inertia valve is positioned between the compression fluid chamber and the reservoir fluid chamber and regulates the flow of fluid in a direction from the compression fluid chamber to the reservoir fluid chamber.

In one exemplary embodiment of the inertia valve, an inertia mass is configured to substantially prevent fluid flow to the reservoir chamber in response to a rider-induced force. Accordingly, because fluid flow from the compression fluid chamber to the reservoir fluid chamber is substantially prevented, compression movement of the shock absorber is substantially prevented because the fluid displaced by the shaft cannot be transferred to the reservoir fluid chamber. In this mode, a bicycle incorporating the shock absorber behaves in a manner similar to a hardtail. The inertia mass is further configured to permit fluid flow to the reservoir in response to a terrain-induced force above a threshold. In this mode, compression movement of the shock absorber is permitted because the fluid displaced by the shaft may be transferred to the reservoir chamber. Thus, in this mode, the bicycle obtains the benefit of rear suspension in absorbing terrain-induced forces.

An exemplary embodiment of U.S. Pat. No. 6,267,400 described immediately above provides numerous benefits when incorporated into the front or rear suspension assembly of a bicycle. Mountain bikes equipped with such shock absorbers are especially well-suited for competitive use, where a high pedaling efficiency is particularly advantageous. In addition, the availability of suspension travel in response to terrain-induced forces allows such a mountain bike to traverse rough terrain more quickly than a "hardtail" bicycle.

SUMMARY OF THE INVENTION

For more general mountain biking use, however, an illustrated embodiment of U.S. Pat. No. 6,267,400 could be further improved. For example, one characteristic of the above-described shock absorber is that it tends to assume a fully extended position when the inertia valve is preventing fluid flow to the reservoir fluid chamber, i.e., when the inertia valve has not been activated by a terrain-induced force above the threshold force. A typical shock absorber (without an inertia valve) assumes a more intermediate position within its range of travel in the absence of moderately large pedaling or terrain-induced forces. This intermediate position is referred to as the "sag position" of the shock absorber. Thus, the tendency of the illustrated shock absorbers of U.S. Pat. No. 6,267,400 is to assume a fully extend position, or topped-out position and may alter the handling characteristics of an associated bicycle, especially when the bicycle frame geometry is not specifically designed for such a shock absorber.

In addition, when compression travel of the shock absorber is permitted, the shock absorber will compress a greater amount than a conventional shock absorber (i.e., an amount of compression due to the bump plus the amount of compression equal to the initial "sag" of a conventional shock), which may be noticeable to a rider of the bicycle. Further, because the shock absorber is normally in a topped-out position, it may not be able to extend in the event that the surface upon which the bicycle is being ridden suddenly drops away from the bicycle wheel, such as in the situation of the bicycle encountering a drop-off or depression.

Accordingly, a need exists for a shock absorber configured to provide a desirable level of pedaling efficiency, while offering at least some amount of "sag". That is, preferably, the shock absorber does not normally assume a fully extended, or topped out, position when a rider's weight is applied to the bicycle. Preferred embodiments of the present position sensitive shock absorber allow the shock absorber to move to a sag position, despite the inertia valve not being activated, to provide a desired ride height of the bicycle. In addition, preferably, the shock absorber becomes locked-out, or substantially locked-out, once the sag position is achieved by, for example, substantially preventing fluid flow in a compression direction within the shock absorber until the inertia valve is activated by an appropriate acceleration force. This feature is especially advantageous when the shock absorber is used with bicycles having relatively longer wheel suspension displacement, or "travel", because the sag constitutes a larger proportion of the overall travel and is thus more easily noticed by the rider. The greater sag distance also changes other related geometries of the bicycle such as head tube angle and seat tube angle to a greater degree than that of relatively shorter travel bicycles. Thus, the benefits of the preferred position sensitive shock absorber system become more pronounced as the suspension travel increases. Furthermore, preferred embodiments of the position sensitive valve may be incorporated within suspension assemblies that do not include an acceleration sensitive inertia valve, but utilize pressure activated valves, or other mechanisms for creating a damping force.

A preferred embodiment is a suspension damper including a piston rod carrying a piston and a tube defining a piston chamber. The piston is configured for reciprocal movement within the piston chamber. A reservoir chamber is defined by the damper and includes a divider configured to move to vary a volume of the reservoir chamber to accommodate fluid displaced from the piston chamber by the piston rod. The suspension damper also includes a fluid passage connecting the piston chamber and the reservoir chamber and a valve having a first position and a second position. The valve preferably permits a first rate of fluid flow through the flow passage in the first position and the valve permits a second rate of fluid flow through the flow passage in the second position. Movement of the divider moves the valve between the first and second position.

Yet another preferred embodiment is a suspension damper including a tube and a piston rod carrying a piston for reciprocal movement within the tube. The piston and the tube define a first fluid chamber. A second fluid chamber is defined by the damper. The suspension damper also includes a first valve configured to move between a first position and a second position in response to an increase in the volume of fluid within the second chamber and a second valve configured to move between a first position and a second position in response to an acceleration force applied to the damper.

Still another preferred embodiment is a suspension damper including a tube and a piston rod carrying a piston for reciprocal movement within the tube. The damper also includes a first valve, normally biased to an open position, and configured to permit the damper to move from a substantially fully extended position to a sag position that is between about 5% and 40% of the total compression travel of the damper. The valve moves to a closed position to maintain the damper at the sag position. The damper also includes a second valve, normally biased to a closed position, configured to permit the damper to move from the sag position to a further compressed position.

BRIEF DESCRIPTION OF THE DRAWINGS

These and other features, aspects and advantages of the present bicycle shock absorber are described below with reference to drawings of preferred embodiments, which are intended to illustrate, but not to limit, the present invention. The drawings contain nineteen (19) figures.

DETAILED DESCRIPTION OF THE PREFERRED EMBODIMENT

Figure 1:
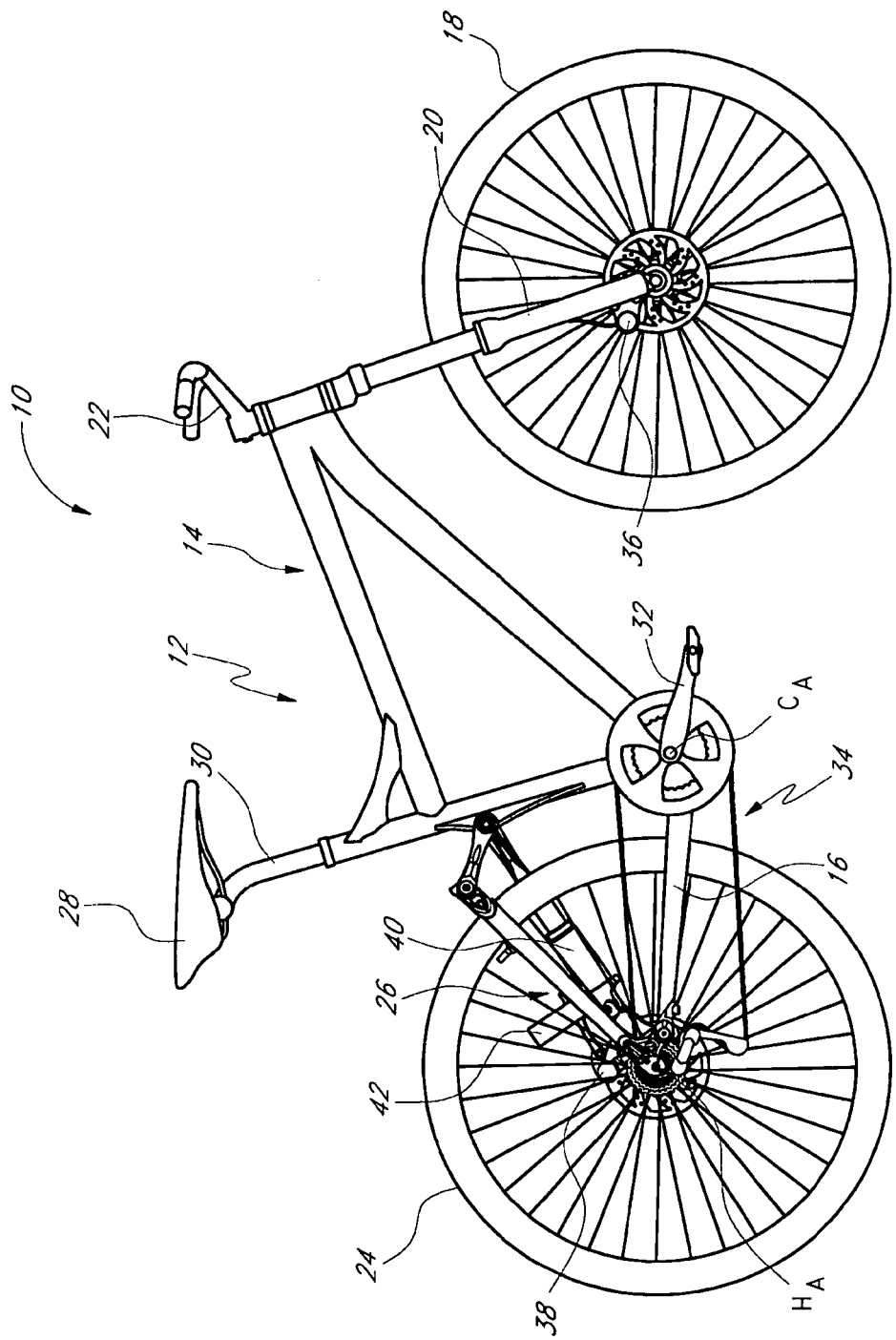
FIG. 1 is an illustration of an off-road bicycle, or mountain bike, which incorporates a shock absorber having certain features, aspects and advantages of the present invention.

FIG. 1 illustrates an off-road bicycle, or mountain bike 10, including a preferred embodiment of a rear suspension assembly, or shock absorber. The bicycle 10 is described herein with reference to a coordinate system wherein a longitudinal axis extends from a forward end to a rearward end of the bicycle 10. A vertical, central plane generally bisects the bicycle 10 and contains the longitudinal axis. A lateral axis extends normal to the longitudinal axis and lies within a horizontal plane. In addition, relative heights are generally expressed as elevations relative to a horizontal surface on which the bicycle 10 is supported in an upright position. The above-described coordinate system is provided for the convenience of describing the bicycle illustrated in FIGS. 1 and 5, and is not intended to limit the scope of the present invention. In addition, certain features and components of the bicycle may be described in terms of relative positions or directions within the particular positions and orientations reflected in the drawings, which is merely for convenience and is not intended to limit the scope of the invention.

The bicycle 10 includes a frame 12, preferably comprised of a generally triangular main frame portion 14 and an articulating frame portion, or subframe 16. The subframe 16 is pivotally connected to the main frame 14. The bicycle 10 also includes a front wheel 18 carried by a front suspension assembly, or front fork 20. A steerer tube (not shown) is journaled for limited rotation about a steering axis defined by the main frame 14. The fork 20 is secured to the main frame 14 by a handlebar assembly 22, as is well known in the art. A rear wheel 24 of the bicycle 10 is carried by the subframe 16. A shock absorber 26 is pivotally connected to both the main frame 14 and the subframe 16 to provide resistance to the pivoting motion of the subframe 16 and, thus, provide resistance to the suspension travel of the rear wheel 24.

In addition, a seat 28 is connected to the frame 12 by a seat post 30, which is received within the seat tube of the main frame 14. The seat 28 provides support for a rider of the bicycle 10. A pedal crank assembly 32 is rotatably supported by the main frame 14 and drives a multi-speed chain drive arrangement 34, as is well known in the art. The bicycle 10 also includes front and rear brake systems 36, 38 for slowing and stopping the bicycle 10. Although the front and rear brakes 36, 38 are illustrated as disc type brakes, alternatively, rim type brakes may be provided, as will be appreciated by one of skill in the art. Rider controls (not shown) are commonly provided on the handlebar assembly 22 and are operable to control shifting of the multi-speed chain drive arrangement 34 and front and rear brake systems 36, 38.

Figure 2:
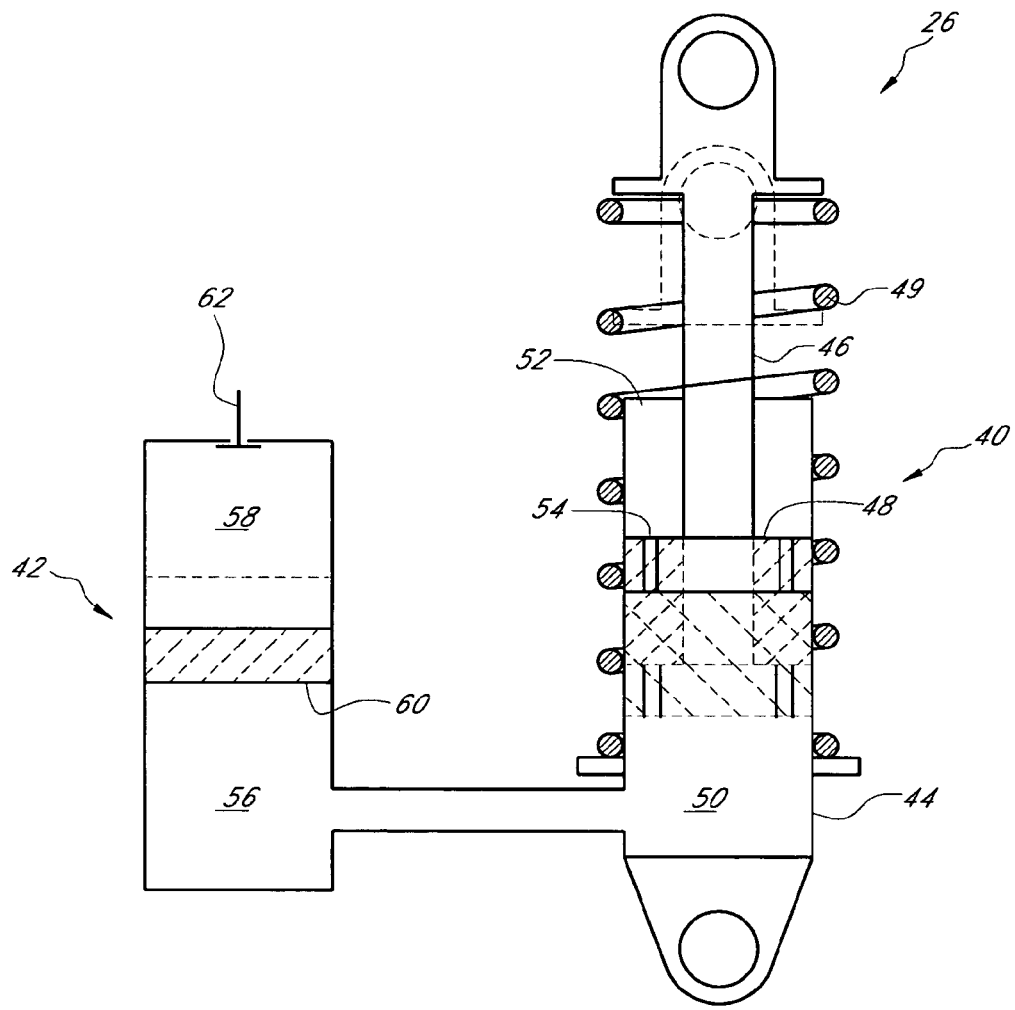
FIG. 2 is an illustrative drawing of the shock absorber of the bicycle of FIG. 1, including a main shock body and a reservoir. Certain internal components of the shock absorber have been omitted for the purpose of clarity.

With reference to FIG. 2 the shock absorber 26 is shown in schematic form with certain components removed for clarity. The shock absorber 26 preferably includes a main shock body 40 and a reservoir 42. The main shock body 40 desirably includes a tube 44 and a piston rod 46. The piston rod 46 carries a piston 48 in sliding engagement with an interior surface of the tube 44. Thus, the piston rod 46 and piston 48 are movable relative to the tube 44. Generally, the shock absorber 26 also includes a suspension spring 49, which is configured to extend the piston rod 46 relative to the tube 44. The illustrated spring 49 is a helical coil spring surrounding the main shock body 40. However, as used herein, the terms suspension spring and spring are broad terms which cover any structure or system tending to move components of the damper relative to one another. For instance, the terms suspension spring and spring are intended to cover, among other structures and systems, mechanical springs (e.g., coil springs, leaf springs and diaphragm springs) and fluid springs (e.g., gas springs). The suspension spring may act indirectly on the damper, such as through a linkage arrangement, for example. In some applications, the shock absorber 26 may be employed without a spring.

The interior of the tube 44 desirably defines a piston chamber and the piston 48 further divides the interior of the tube 44 into a compression chamber 50 and a rebound chamber 52. The piston 48 desirably includes through-ports 54 which permit fluid to flow between the compression chamber 50 and the rebound chamber 52. However, as the piston 48 moves progressively further into the tube 44, the piston rod 46 takes up an increasing volume of the rebound chamber 52. That is, the reduction in volume of the compression chamber 50 is greater than the increase in the volume of the rebound chamber 52 (by an amount equal to the volume of the piston rod 46, or "rod volume", introduced into the tube 44). As a result, a reservoir chamber 56 is provided to accept the excess fluid that cannot be accommodated by the rebound chamber 52.

Thus, the reservoir chamber 56 is an accumulator that accepts excess damping fluid upon compression of the shock absorber 26, and then returns the fluid to the main shock body 40 upon expansion or rebound of the shock absorber 26. Although the illustrated reservoir chamber 56 is defined by a separate structure from the main shock body 40 (a tube, in this instance), in other arrangements the reservoir 42 and shock body 40 may share common structural components. Furthermore, in some arrangements, a separate reservoir chamber 56 may not be provided. Instead, the compression 50 and/or rebound 52 chambers may be configured to vary in volume to accommodate fluid displaced by the piston rod 46. Other suitable compensation mechanisms may also be used.

In the illustrated arrangement, the reservoir chamber 56 is separated from a gas chamber 58 by a separator, such as a floating piston 60. The gas chamber 58 exerts a force on the piston 60, which pressurizes the fluid within the reservoir chamber 56. The piston also acts as a wall of the reservoir chamber 56 and moves in an upward direction in response to the influx of fluid into the reservoir chamber 56. It should be noted that the floating piston 60 may be replaced by other suitable separating structures (such as a flexible diaphragm, for example). Furthermore, preferably, a reservoir sealing cap 61 desirably includes a valve 62 that permits the pressure within the gas chamber 58 to be adjusted. In some arrangements, the gas chamber 58 may be replaced by an alternative compressible material, such as a member formed of compressible closed-cell foam, for example.

Figure 3:
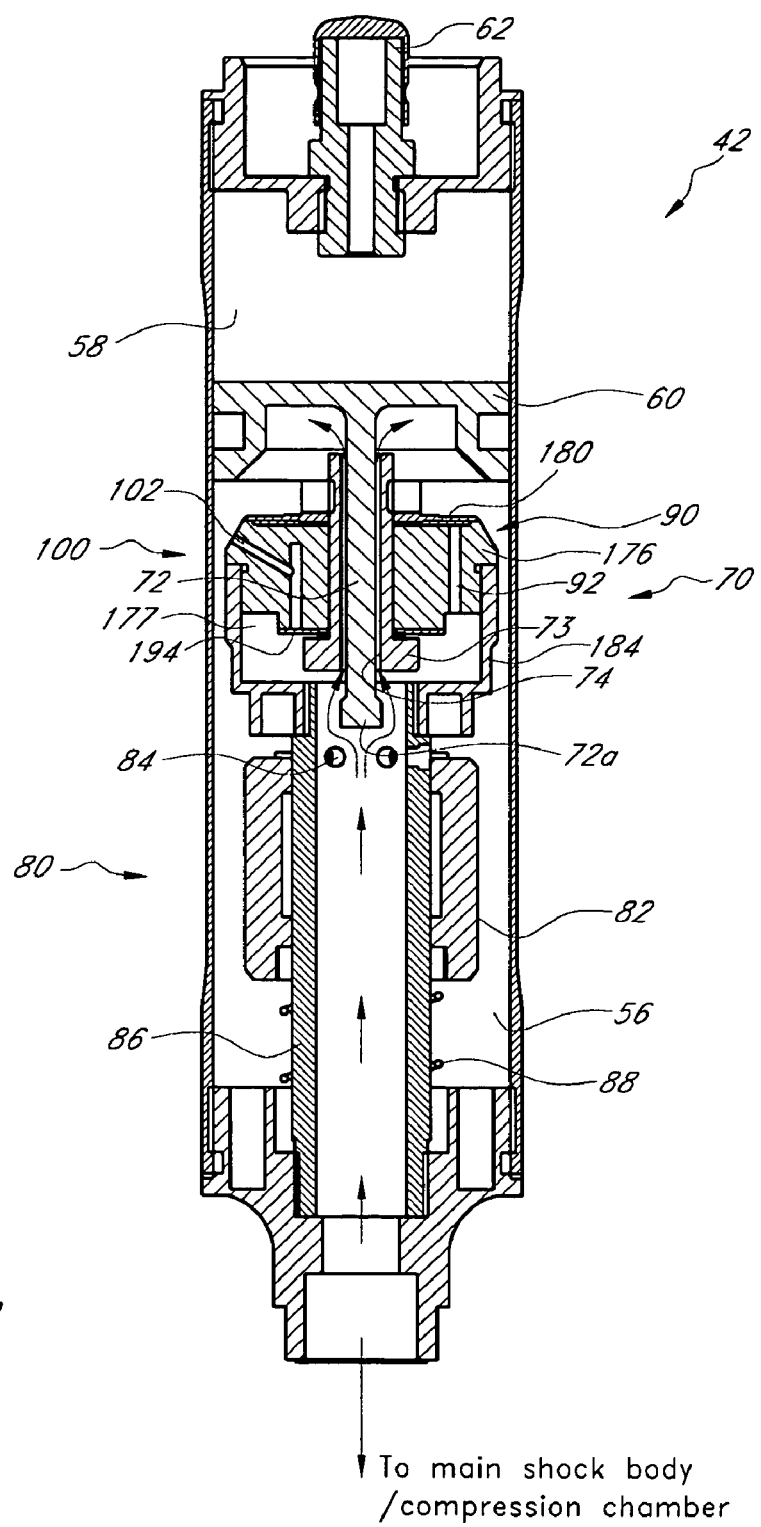
FIG. 3 is a cross-sectional view of the reservoir of a shock absorber of the type illustrated in FIG. 2, which includes a position sensitive valve, a blow off valve and an inertia valve. A floating piston separates a reservoir damping fluid chamber from a gas chamber.

Preferably, additional fluid flow circuits or valve assemblies are included within the reservoir, but are not shown in FIG. 2 for the purpose of clarity. With reference to FIG. 3, a preferred embodiment of the position-sensitive valve assembly 70 utilizes the movement of the floating piston 60 to control a metering valve. FIG. 3 is a cross-section of a reservoir 42 employing a preferred valve assembly 70. However, as discussed above, the reservoir 42 may be omitted and the floating piston 60 may be positioned in an alternative location, such as the main shock body 40, for example.

As illustrated in FIG. 3, a metering rod 72 extends downwardly from the floating piston 60. The metering rod 72 includes an enlarged end portion 72a that selectively permits or prevents fluid flow through a metering rod flow port 74. The O.D. of the enlarged end 72a is sized to permit the enlarged end 72a to enter the metering rod flow port 74 defined by a metering valve sleeve 73. When the enlarged end 72a of the metering rod 72 is present within the metering rod flow port 74, fluid flow through the port 74 is inhibited, and preferably, is at least substantially prevented. However, some amount of flow may occur through a clearance space between the enlarged end 72a and the port 74, which may occur due to normal manufacturing variations or which may be purposefully provided to ensure ease of movement of the metering rod end 72a within the port 74.

In the specific arrangement of FIG. 3, the shock absorber 26 includes an inertia valve 80, which includes an inertia mass 82 that selectively closes fluid ports 84 to inhibit or prevent fluid flow from the main shock body 40 to the reservoir chamber 56. Thus, when the inertia mass 82 of the inertia valve 80 is in a closed (upward) position, flow to the reservoir chamber 56 preferably occurs primarily through the metering rod flow port 74. It is noted that, while the inertia mass 82 may be described as having an open and a closed position, the inertia mass 82 likely does not completely prevent flow through the inertia valve fluid ports 84 in the closed position. That is, a fluid-tight seal is not typically created between the inertia mass 82 and the shaft 86 on which it slides. Thus, some fluid may flow through the inertia valve 80 in its closed position. Such fluid flow is often referred to as "bleed flow" and, preferably, is limited to a relatively small flow rate. To create a fluid-tight seal between the inertia mass 82 and the shaft 86 would require precise dimensional tolerances, which would be expensive to manufacture, and may also inhibit movement of the inertia mass 82 on the shaft 86 in response to relatively small acceleration forces.

As the shock absorber 26 is compressed, the floating piston 60 moves in an upward direction due to the displacement of damping fluid from the main shock body 40 until the enlarged end 72a of the metering rod 72 blocks the flow port 74. Once the flow port 74 is blocked, preferably, fluid is not able to flow (at least at a significant flow rate) into the reservoir chamber 56 and the shock absorber 26 becomes effectively locked-out. That is, the excess fluid from the main shock body 40 cannot be displaced to the reservoir chamber 56, because both the inertia valve ports 84 and the metering rod flow port 74 are closed, and has no place to go. In an alternative arrangement, fluid flow may be only reduced by one or both of the inertia valve 80 and the position sensitive valve assembly 70. In such an arrangement, fluid flow through the inertia valve 80 or metering rod flow port 74 is merely reduced in a closed position versus the flow permitted in an open position to increase a damping force provided by the shock absorber 26.

The illustrated structure allows the shock absorber 26 to move partially through its range of travel to a predetermined "sag" position, before becoming locked-out (or the damping rate increased). Desirably, the sag position is between about 5% and 40% of the total travel of the shock absorber 26 or the shock stroke. Preferably, the sag position is between about 15% and 30% of the shock stroke and, more preferably, is about 25% of the shock stroke. It is noted that, in some bicycle applications, the total travel of the shock absorber 26 when assembled to a bicycle may vary from the total travel of the shock absorber 26 by itself, due to physical limitations imposed by the specific bicycle rear suspension assembly. The lock-out feature is beneficial to inhibiting a riders pedaling movement from compressing the shock absorber 26 and wasting energy. When a bump is encountered, preferably, the inertia valve 80 opens to permit fluid flow from the compression chamber 50 to the reservoir chamber 56 and, thus, compression of the shock absorber 26 is permitted. In other arrangements, the enlarged portion 72a of the metering rod 72 could be positioned elsewhere along the rod 72 to achieve closing of the flow port 74 at other relative positions of the piston rod 46 and tube 44. Furthermore, multiple enlarged portions may also be used to lock-out, or increase the damping rate, at other relative positions of the piston rod 46 and tube 44.

Figure 4:
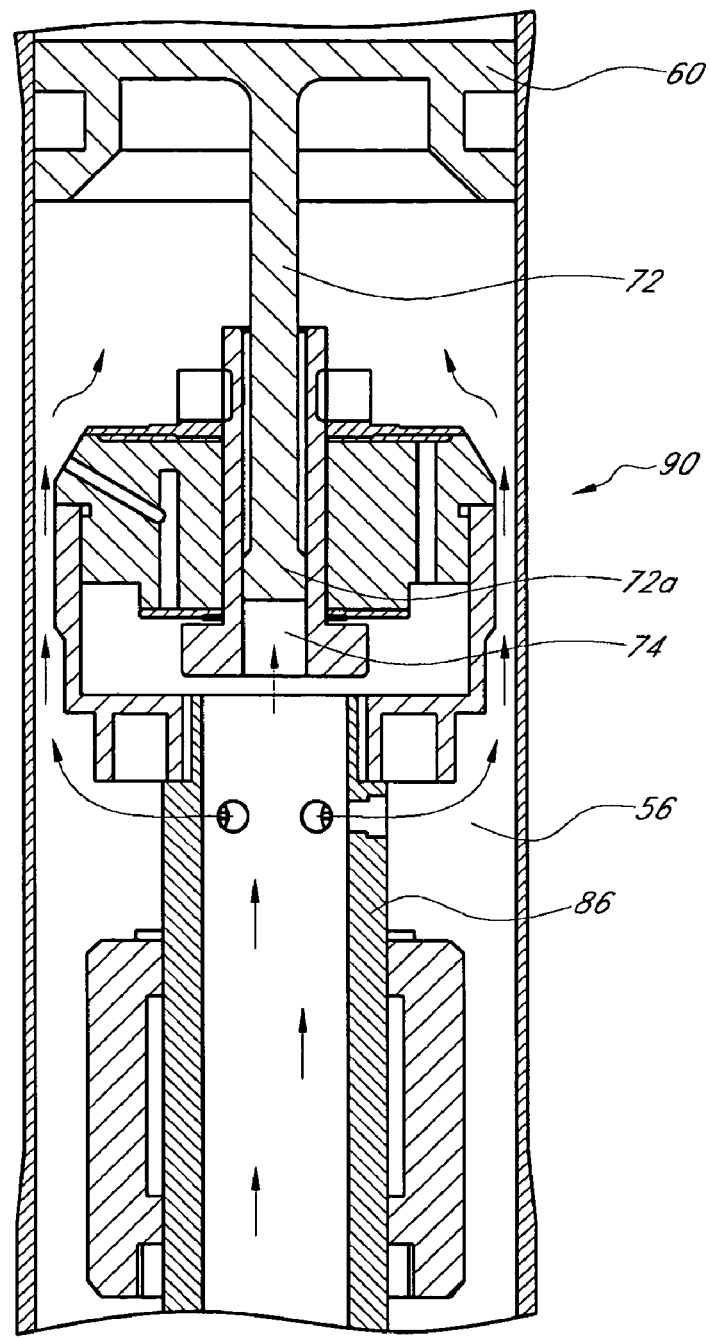
FIG. 4 is an enlarged view the reservoir of FIG. 3 with the floating piston in an elevated position.

FIG. 4 is an enlarged cross-section of the reservoir 42 that shows the position sensitive valve 70 in the closed position having substantially blocked the flow from shaft 86 to the reservoir chamber 56 through the flow port 74. The enlarged end 72a is carried in an upward direction from the open position shown in FIG. 3 by the metering rod 72, which is connected to the floating piston 60. The illustrated position shows fluid flowing in through the open inertia valve 80, bypassing the closed position sensitive valve assembly 70, and displacing the floating piston 60 upward, which draws the enlarged end 72a up and into the flow passage 74.

With reference to FIG. 3, an additional feature of the illustrated shock absorber 26 is that the inertia mass 82 is configured to be held open by fluid flow. That is, preferably, the inertia mass 82 has a relatively large, flat upper surface. The fluid flowing from the inertia valve ports 84 (when the inertia valve 80 is open) is sufficient to overcome the biasing force of the inertia valve biasing spring 88 to maintain the inertia mass 82 in an open position when fluid flow through the ports 84 is present. Preferably, the inertia mass 82 is biased to the open position in this manner substantially to the point that fluid flow ceases (i.e., compression of the shock absorber 26 ceases). Without this feature, the inertia mass 82 will tend to close when acceleration of the shock absorber 26 decreases, which is typically prior to the end of the compression stroke. In other arrangements, it is desirable to allow the inertia mass 82 to move to a closed position more quickly so that the damping rate of the shock absorber 26 increases and, accordingly, the pedaling efficiency of the associated bicycle 10 is quickly restored. In such arrangements, it may be desirable to avoid holding the inertia mass 82 in an open position due to fluid flow through the inertia valve 80 and, thus, the fluid flow control mechanisms, such as the large, flat upper surface of the illustrated inertia mass 82 may be omitted.

Although the illustrated shock absorber 26 includes an inertia valve 80, in other arrangements, the inertia valve 80 may be omitted or may be replaced with, or supplemented with, other compression or rebound fluid flow valves. The inertia valve 80 is preferred because it operates to distinguish terrain-induced forces from rider-induced forces. Terrain-induced forces are generally upwardly directed (compression) forces caused by the vehicle (such as a bicycle) encountering a bump. Rider-induced forces, in the case of a bicycle application, typically are short duration, relatively large amplitude forces generated from the pedaling action of the rider. The inertia valve may alternatively be configured to operate in response to rebound forces, rather than compression forces.

The illustrated reservoir 42 of the shock absorber 26 also includes a bypass valve, or blow-off valve 90. The blow-off valve 90 permits fluid flow in compression of the shock absorber 26 alternative to flow through the inertia valve 80 or position sensitive valve assembly 70. The blow-off valve 90 preferably works in parallel with the inertia valve 80 when the demand for fluid flow is greater than can be handled by the inertia valve 80 alone. However, the blow-off valve 90 may also open while the inertia valve 80 and/or position sensitive valve assembly 70 are closed in response to relatively high fluid pressures to permit compression fluid flow and prevent damage to the seals of the shock absorber 26 or to other components that may be damaged by excessive fluid pressure.

The illustrated blow-off valve 90 includes a blow off fluid chamber 177 defined between a blow off valve base 184 and a blow off valve piston 176. These two components are illustrated in a "cup and lid" type arrangement with the blow off piston 176 being substantially sealed with and on top of the blow off valve base 184. The blow off valve piston 176 includes a number of axial ports 92 extending from the bottom of the valve piston 176 to the top of the valve piston 176, which are capable of transmitting fluid from the blow off chamber 177 to the reservoir chamber 56. The axial ports 92 are preferably spaced around the longitudinal axis of the piston 176. The ends of the axial ports 92 opening into the reservoir chamber 56 are preferably covered by one or more flexible shims 180. The flexible shim 180, preferably, allows fluid to pass from the blow off chamber 177 to the reservoir chamber 56 and prevents fluid flow in the opposite direction. Although a shim-type valve is illustrated in the reservoir 42 of FIG. 3, any other suitable valve structure may also be used.

The illustrated reservoir 42 of the shock absorber 26 further includes a rebound flow valve 100 that permits the flow of fluid from the reservoir chamber 56 back to the compression chamber 50 of the main shock body 40. Thus, fluid that flows to the reservoir chamber 56 through the position sensitive valve assembly 70, inertia valve 80 and/or blow-off valve 90, preferably returns to the main shock body 40 upon expansion or rebound of the shock absorber 26 through the rebound flow valve 100.

The illustrated rebound valve 100 includes another set of ports 102 in the blow off piston 176 that connect the blow off chamber 177 to the reservoir chamber 56. In the illustrated arrangement, the ports 102 include an axial portion opening into the blow off chamber 177 and a generally radial portion opening into the reservoir chamber 56. The ends of the ports 102 opening into the blow off chamber 177 are covered by one or more flexible shims 194. This arrangement allows for fluid to return from the reservoir chamber 56 to the main shock body 40 of FIG. 2. That is, the flexible shim 194 allows fluid to pass from the reservoir chamber 56 to the shaft 86 and prevents fluid flow in the opposite direction. Although a shim-type valve is used in the reservoir 42 of FIG. 3, any other suitable valve may also be used.

Figure 5:
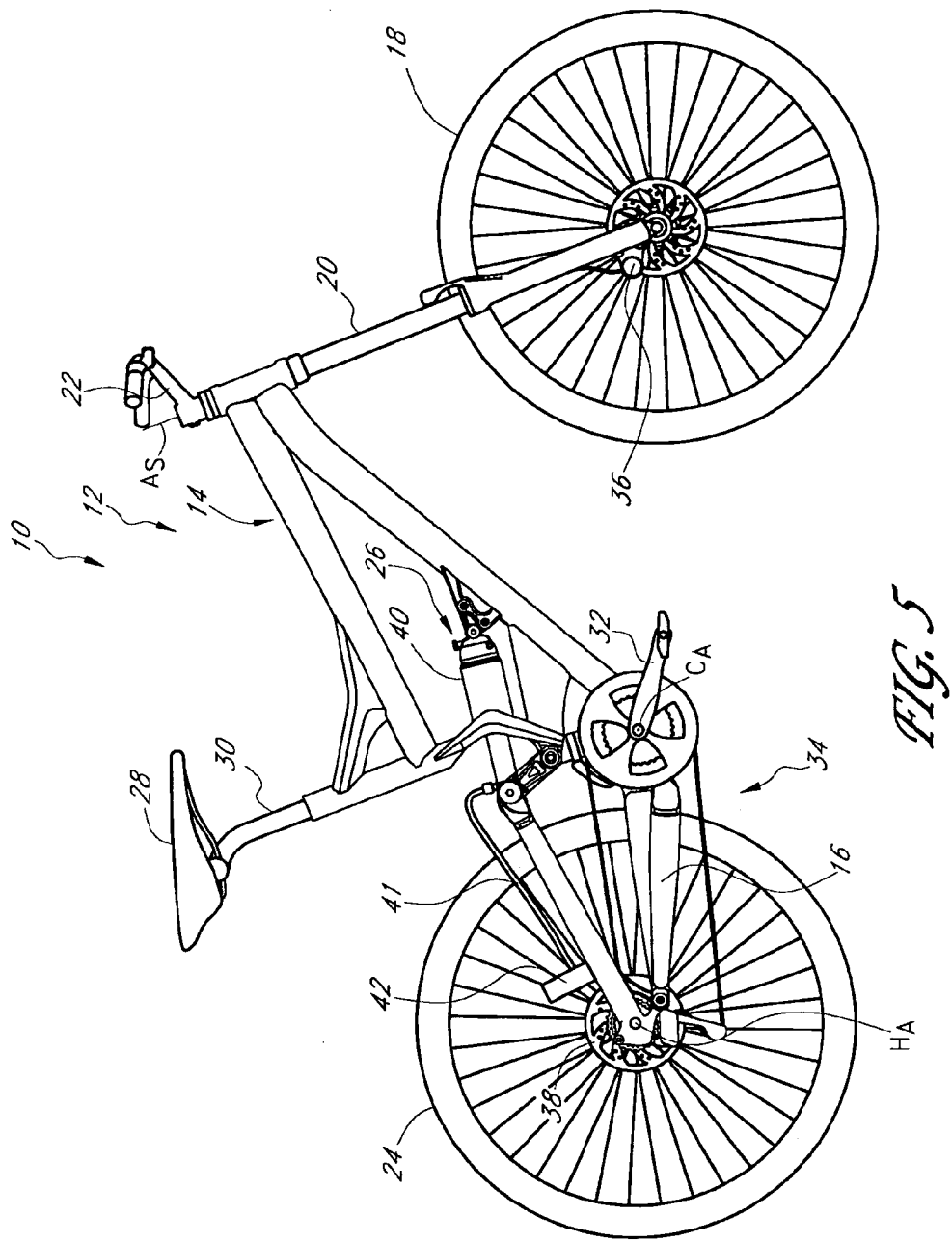
FIG. 5 is an off-road bicycle, or mountain bike, which incorporates a modification of the shock absorber of FIG. 2.

FIG. 5 illustrates an off-road bicycle or mountain bike 10 that is substantially similar to the off-road bicycle 10 illustrated in FIG. 1, but includes a modified version of the shock absorber 26 from that described above. For convenience, components in FIG. 5 will be referred to by the same reference numerals as the corresponding components in FIGS. 1-4. The bicycle 10 of FIG. 5 includes substantially the same features as the bicycle 10 of FIG. 1, including a generally triangular mainframe 14, a pivotally connected subframe 16, a front wheel 18, a rear wheel 24, a shock absorber 26, and a front fork 20.

Unlike the bicycle 10 of FIG. 1, in the bicycle 10 of FIG. 5 the main shock body 40 and reservoir 42 of shock absorber 26 are not structurally connected, but are connected by a flexible hydraulic hose or tube 41. This design modification provides the ability to mount the shock absorber reservoir 42 and the shock absorber main body 40 in relatively different positions. Accordingly, the reservoir 42 may be positioned in a location specific to the application in order to sense terrain features without requiring the main shock body 40 to be in a substantially nearby location.

Figure 6:
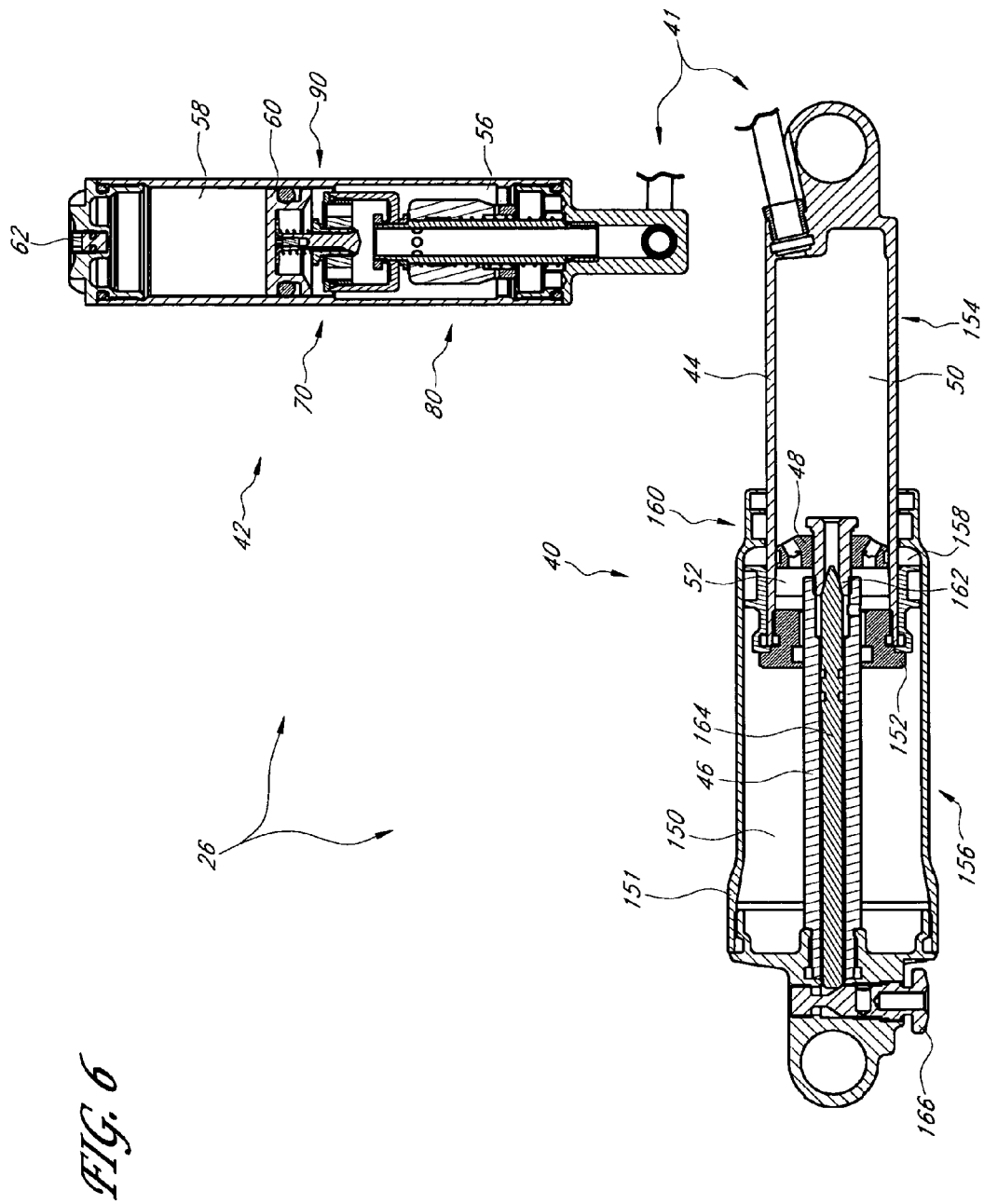
FIG. 6 is a cross-sectional view of the shock absorber of FIG. 5, which includes a main shock body and a reservoir.

FIG. 6 is a cross-sectional view of the shock absorber 26 shown in FIG. 5. The shock absorber 26 includes a main shock body 40 and a reservoir 42 that are hydraulically connected by a hose or tube 41 (not entirely shown). The shock absorber 26 includes a damping assembly 154 and a spring assembly 156. The spring assembly 156 is preferably located within the main shock body 40. The damping assembly 154 is divided between the main shock body 40 and the reservoir 42, with the reservoir 42 including an inertia valve assembly 80 and a position sensitive valve assembly 70.

The shock absorber 26 illustrated in FIG. 6 uses a compressed gas to bias the main shock body 40 toward an extended position. The compressed gas is stored in a gas chamber 150, which is defined by a tube, or gas cylinder 151. The gas chamber 150 is partitioned from the fluid filled compression and rebound chambers 52 and 50 by an annular piston 152. The piston 152 is in sealed, slidable engagement with both the piston shaft 46 and the inner wall of the gas cylinder 151. The illustrated piston 152 is shown as two pieces but may be one integrated piece. The pressure of the compressed gas may be adjustable by a valve (not shown) configured to permit communication with the gas chamber 150.

During operation, the tube 44 is displaced along a longitudinal axis of the main shock body 40 into the interior of gas cylinder 151, which reduces the volume of the gas chamber 150. This reduction of volume increases the pressure of the gas chamber 150 and thus increases the biasing force tending to extend the main shock body 40. A compressed gas shock absorber is beneficial in that the biasing force of the compressed gas may replace that of a metallic coil spring, which results in a reduced weight of the shock absorber 26.

The illustrated shock absorber 26 also includes a negative gas chamber 158 defined between an end seal assembly 160 of the gas cylinder 151 and the piston cap 152. The negative gas chamber 158 exerts a force which resists expansion of the shock absorber 26. This force preferably assists in the initial compression stages of the shock absorber 26 and thus creates a smoother compression action.

With continued reference to FIG. 6, preferably, the damping assembly 154 is fundamentally similar to that used in the shock absorber 26 of FIG. 2. A tube 44 is filled with a damping fluid. A piston 48 is carried by a piston rod 46. The piston 48 separates the tube 44 into a compression chamber 50 and a rebound chamber 52. As the shock compresses and extends, the piston 48 and the piston rod 46 move along a longitudinal axis of the main shock body 40 relative to the tube 44. The movement of the piston 48 through the fluid in the tube 44 produces a damping force that slows the velocity of extension and compression of the main shock body 40.

The piston 48 includes one or more axial compression passages that are covered on the end opening into the rebound chamber 52 by a shim or shim stack. The compression passages and shim or shim stack allows fluid to flow through these passages during compression but not during rebound. During rebound, the fluid flows from the rebound chamber 52 through an adjustable valve 162, located within the interior of the piston rod 46 near the piston 48, and into the compression chamber 50. The flow rate through the valve 162 is controlled by an adjustment rod 164 that is preferably connected to an external adjustment knob 166. In addition, other flow circuits between the compression and rebound chambers may also be provided.

During compression, the piston 48 moves progressively further into the tube 44 and the piston rod 46 takes up an increasing volume of the rebound chamber 52, as discussed above. Accordingly, a reservoir chamber 56 is provided to accept the excess fluid that cannot be accommodated by the rebound chamber 52. The fluid flow into the reservoir 42 is preferably controlled by one or more of the position sensitive valve assembly 70, the inertia valve assembly 80 or the blow off valve 90 at any given time. Thus, preferably, these valve assemblies control the compression damping of the shock absorber 26.

With reference to FIGS. 7-14, the position sensitive valve assembly 70, the inertia valve assembly 80 and the blow off valve 90 of the shock absorber 26 of FIG. 6 are described in greater detail. As discussed above, when damping fluid is introduced into the reservoir 42 due to displacement of fluid from the main shock body 40 by the piston rod 46, the fluid may enter the reservoir 42 through any of the position sensitive valve assembly 70, the inertia valve assembly 80 and the blow off valve 90, depending upon the various operational factors at that particular time. If the fluid flow is a result of a shock absorber compression induced by a downward force, such as a rider sitting on a bicycle, the fluid will preferably enter the reservoir 42 through the position sensitive valve 70, until the floating piston 60 has displaced a predetermined amount and the position sensitive valve 70 closes. The resulting compression position of the shock absorber 26 preferably corresponds to a desired sag position.

If a downward force continues to be applied to the shock absorber 26, fluid flow through the position sensitive valve 70 preferably is prevented, such that the shock absorber 26 remains substantially rigid, or locked-out, until the fluid pressure increases to a threshold necessary to activate the blow off valve 90. Additional fluid flow into the reservoir chamber 56 continues to displace the piston 60 in an upward direction.

If an upward wheel force is applied to the shock absorber 26 sufficient to open the inertia valve 80, fluid is permitted to enter the reservoir chamber 56 through the inertia valve 80. If the fluid pressure within the compression chamber 50 increases above a threshold pressure, with or without the inertia valve 80 being open, fluid flow is permitted through the blow off valve 90 thus preventing any damage to shock absorber components that are sensitive to high fluid pressure conditions and/or allowing for a large volume of fluid to be displaced on larger bump impacts. After the compression force applied to the shock absorber 26 is sufficiently reduced or removed, the spring assembly 156 tends to extend the shock absorber 26. In response, fluid is permitted to exit the reservoir chamber 56 through the rebound valve 100.

In a number of respects, the position sensitive valve 70 of FIGS. 6-14 is similar in construction and function to the valve 70 described above in connection with FIGS. 1-4. However, in the position sensitive valve 70 of FIGS. 6-14, the metering rod 72 is not coupled to the floating piston 60. Accordingly, the length of the metering rod 72 does not need to be determined by the distance of movement of the floating piston 60, which is related to the total travel of the shock absorber 26.

The illustrated position sensitive valve 70 includes the metering rod 72, a metering rod sleeve 73, a flange 172, and a biasing spring 170. As discussed immediately above, the metering rod 72 is not attached to the floating piston 60. The illustrated metering rod 72 is however, opened and closed by axial movement of the floating piston 60 along a longitudinal axis of the reservoir 42. The metering rod 72 is a generally cylindrical rod that is movable within the metering rod sleeve 73. The metering rod sleeve 73 is a tube with one end forming an enlarged flange. The flange creates a stop surface for installation of the metering rod sleeve 73 into the blow off valve piston 176 and preferably retains the shims of the blow off valve 90 against the blow off valve piston 176. The metering rod sleeve 73 preferably is attached to the blow off valve piston 176 by a threaded interface, however, other suitable attachment mechanisms could also be used. In some arrangements, the metering rod sleeve 73 and the blow off valve piston 176 may be a single component.

The metering rod 72 preferably includes two enlarged ends. The bottom end 72a is sized such that it that does not allow the metering rod 72 to pass through the flow passage 74. The enlarged end 72a and the lower end of the flow passage 74 preferably are configured to cooperate as a valve body and a valve seat respectively, to selectively permit or prevent fluid flow through the flow passage 74.

The top end of the metering rod 72 preferably includes a flange 172 that is removably attached to the metering rod 72. One advantage of having the flange 172 removable from the metering rod 72 is that it allows for ease of assembly of the metering rod 72 within the flow passage 74 of the blow off valve piston 176. A biasing spring 170 contacts the bottom surface of the flange 172 and the top surface of the metering rod sleeve 73 to biased the metering rod 72 into a closed position. Preferably, the biasing spring 170 is configured to apply a force to the metering rod 72 sufficient to create a substantially fluid tight seal between the metering rod sleeve 73 and the enlarged end of the metering rod 72a.

The metering rod 72 preferably includes longitudinal grooves 182 (FIG. 11) to increase a flow area of the fluid flow passage 74 and allow for greater fluid flow when the position sensitive valve assembly 70 is in the open position. The grooves 182 are illustrated as being generally semi-cylindrical, but may be of any suitable shape to enhance fluid flow through the passage 74. A lower end of each groove 182 is spaced upwardly from the enlarged end 72a of the metering rod 72 so as to not allow fluid flow past the closed metering valve 178. It may be desirable, in some arrangements, to extend the grooves 182 to the enlarged end 72a of the metering rod 72 in order to permit a limited amount of bleed flow when the metering valve 178 is closed.

One of the advantages of the position sensitive valve assembly 70 of FIGS. 7-14 is the reduced size over the position sensitive valve assembly 70 of FIG. 3-4 because the length of the metering rod 72 is not determined by the amount of travel of the floating piston 60 (or shock absorber 26). Since the metering rod 72 is not connected to the floating piston 60 the metering rod 72 can be made shorter as it is not required to travel with the floating piston 60 through the floating piston's entire stroke. This allows the metering rod 72 to be made only long enough to move with the floating piston 60 between the fully extended and sag position, and not during the entire compression stroke of the shock absorber 26. As with many suspended vehicles, including bicycles, weight is a very important factor that determines relative performance of a product over that of a competitor's. The reduced size of the position sensitive valve assembly 70 of FIG. 7-14 allows the weight to be reduced.

With reference to FIGS. 7-10 the reservoir 42 also includes an inertia valve assembly 80 which includes an inertia mass 82 that selectively closes fluid ports 84 to inhibit or prevent fluid flow from the main shock body 40 to the reservoir chamber 56. Thus, when the inertia mass 82 of the inertia valve 80 is in a closed (upward) position, flow to the reservoir chamber 56 preferably is only possible through the metering rod flow port 74 or the blow off valve 90.

Similar to the inertia valve 80 of FIGS. 3 and 4, inertia mass 82 of FIGS. 6-10 is configured to be held open by fluid flow. That is, the inertia mass 82 has a relatively large, flat upper surface. The fluid flowing from the inertia valve ports 84 (when the inertia valve 80 is open) is sufficient to overcome the biasing force of the inertia valve biasing spring 88 to maintain the inertia mass 82 in an open position until fluid flow ceases (i.e., compression of the shock absorber 26 ceases). Without this feature, the inertia mass 82 will tend to close when acceleration of the shock absorber 26 decreases, which is typically prior to the end of the compression stroke.

Another additional feature of the illustrated inertia valve 80 is that the bottom of the inertia mass 82 includes a plurality of radial fluid flow ports 186 that extend through a lower end of the inertia mass 82. The ports 186 permit fluid to be evacuated from an annular space 187 between the lower end of the inertia mass 82 and the shaft 86 as the inertia mass 82 moves in a downward direction on shaft 86. Advantageously, such a feature reduces the resistance to downward movement of the inertia mass 82 to enhance the sensitivity of the inertia valve 80. Furthermore, in the fully open position, the bottom of the inertia mass 82 comes into contact with the top of reservoir base 188. This contact could undesirably restrict the inertia mass 82 to the reservoir base 188 by suction. The ports 186 allow fluid to relieve the undesirable suction and allow the inertia valve spring 88 to bias the inertia mass 82 back to its closed position without any opposing forces created by suction.

Another additional feature of the illustrated inertia valve 80 is that the reservoir base 188 includes a plurality of cavities 189. The cavities 189 are preferably in a radial arrangement around the base of the shaft 86 and extend from the top side of the reservoir base 188, facing the reservoir chamber 56, to a partial depth into the base 188. One benefit of the cavities 189 is that they provide a reduced contact area between the inertia mass 82 and the reservoir base 188 when the inertia mass 82 is in the downward, or open position. This feature advantageously helps to reduce any vacuum that may occur between the inertia mass 82 and the reservoir base 188. Another benefit of the cavities 189 is that they reduce the weight of the reservoir base 189. A lighter weight is desirable in many bicycle applications due to the higher possible speeds that may be attained with reduced equipment weight.

Figures 7, 8:
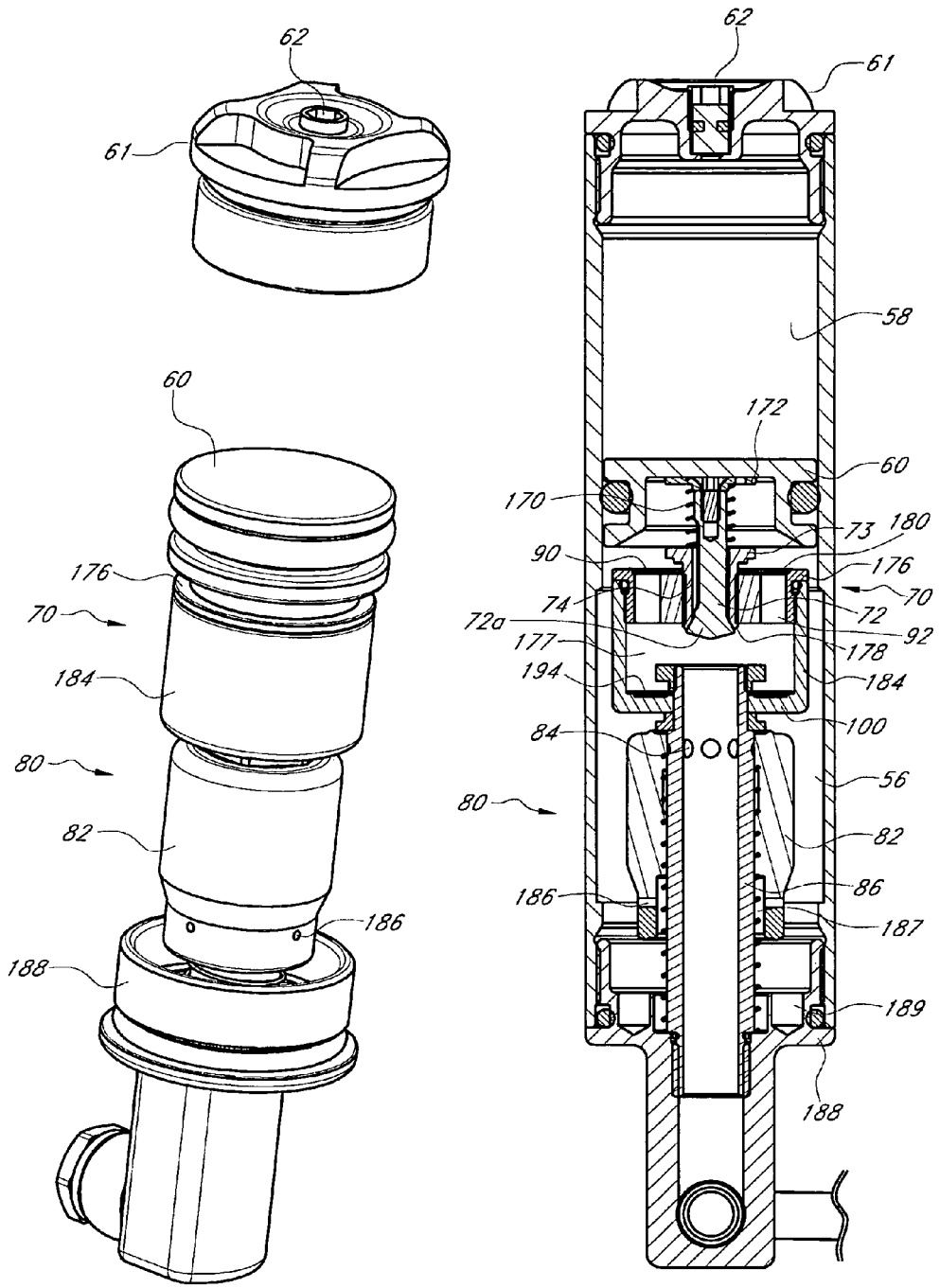
FIG. 7 is a perspective view of the reservoir of FIG. 6 with certain components removed for clarity.
FIG. 8 is an enlarged cross-sectional view of the reservoir of FIG. 6, illustrating a position sensitive valve, a blow off valve and an inertia valve.
Figure 9:
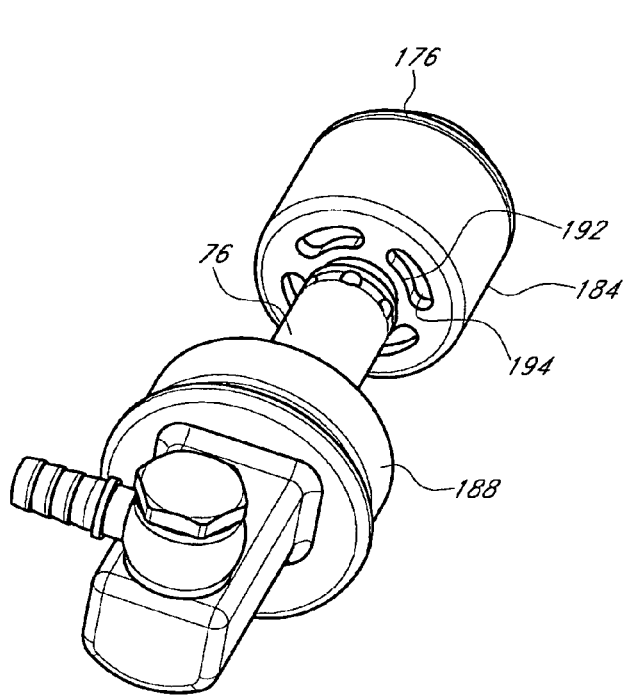
FIG. 9 is a perspective view of certain components of the reservoir of FIG. 6.
Figure 10:
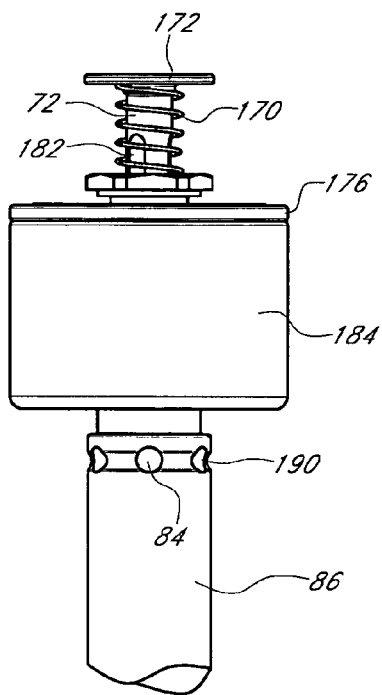
FIG. 10 is a side view of certain internal components of the reservoir of FIG. 6, including components of a metering valve of the position sensitive valve assembly.
Figure 11:
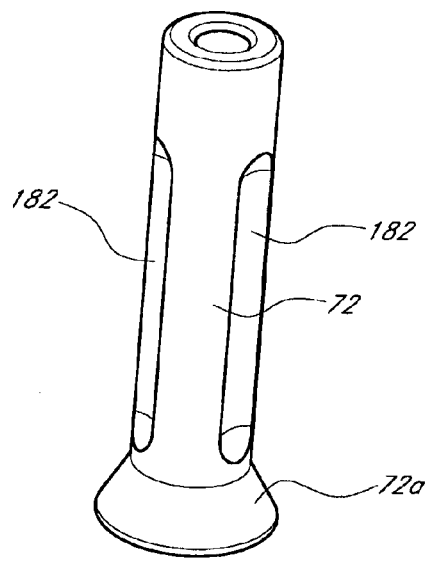
FIG. 11 is a perspective view of a metering rod of the metering valve of FIG. 10.

With reference to FIGS. 8 and 10, another advantageous feature of the illustrated inertia valve 80 is a circumferential groove 190 in the shaft 86 aligned with the inertia valve flow ports 84. The groove 190 is preferably semi circular in cross-sectional shape and has a centerline that passes through the center points of the inertia valve flow ports 84. The width of the groove 190 preferably is less than the diameter of the inertia valve flow ports 84 such that the ports 84 have portions extending both above and below the groove 190. The groove 190 allows communication of the fluid exiting the collection of inertia valve flow ports 84. From the groove 190, fluid pressure is applied evenly over the inner circumference of the inertia mass 82. The even distribution of fluid pressure preferably creates a force tending to center the inertia mass 82 around the shaft 86, thus partially or fully compensating for any inconsistencies in fluid pressure that would otherwise occur due to variations in size between the inertia flow ports 84. Such a feature helps to prevent binding of the inertia mass 82 on the shaft 86. The prevention of binding of the inertia mass 82 on the shaft 86 is beneficial in a bicycle application because it is desirable that the inertia valve be very sensitive to any terrain features which may only transmit relatively small acceleration forces to the inertia valve 80.

Although the illustrated reservoir 42 includes an inertia valve 80, in other arrangements, the inertia valve 80 may be omitted or may be replaced with, or supplemented with, other compression or rebound fluid flow valves. The inertia valve 80 is preferred because it operates to distinguish terrain-induced forces from rider-induced forces. Terrain-induced forces are generally upwardly directed (compression) forces caused by the vehicle (such as a bicycle) encountering a bump. Rider-induced forces, in the case of a bicycle application, typically are short duration, relatively large amplitude forces generated from the pedaling action of the rider. The inertia valve may alternatively be configured to operate in response to rebound forces, rather than compression forces.

Figure 14:
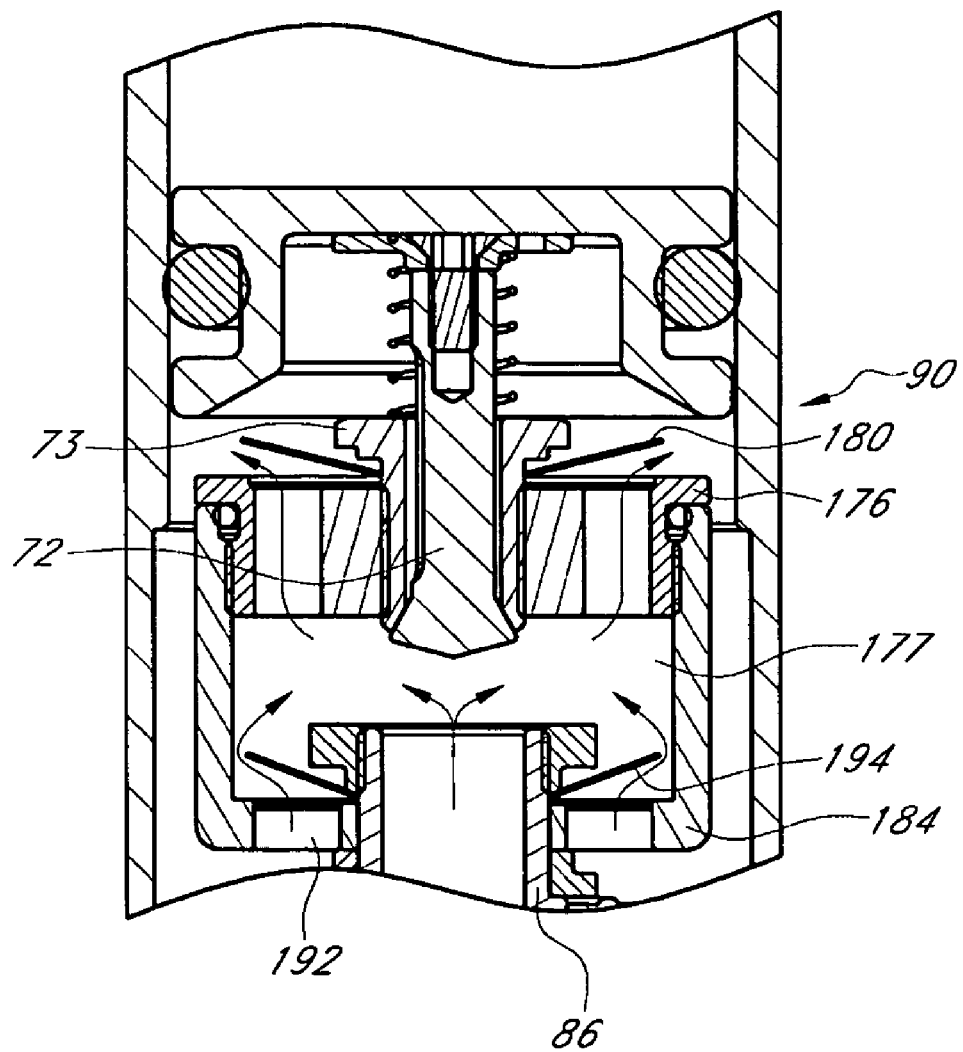
FIG. 14 is an enlarged cross-sectional view of the position sensitive valve in a closed position with the blow off and rebound valves open.

With reference to FIGS. 7-8 and 14, the reservoir 42 preferably includes a blow off fluid chamber 177 on top of and in fluid communication with the interior space of the shaft 86. The blow off chamber 177 is defined between the blow off valve base 184 and the blow off valve piston 176. These two components are illustrated in a "cup and lid" type arrangement with the blow off piston 176 being substantially sealed with and on top of the blow off valve base 184. The blow off valve is located at the top of the blow off chamber 177.

The blow off piston 176 includes a plurality of axial ports 92 that are covered by a flexible shim 180 on the top side of the blow off piston 176. The blow-off valve 90 preferably is configured to open in response to relatively high fluid pressures in the blow-off chamber 177, such as when a relatively large impact occurs while the inertia valve 80 and/or position sensitive valve assembly 70 are closed. The blow-off valve 90 is also configured to permit compression fluid flow and prevent damage to the shock absorber seals or other components that may be damaged by excessive fluid pressure and/or to permit high fluid flow to allow for proper shock movement on higher frequency impacts. Although a shim type valve is used in the reservoir of FIGS. 7-8 and 14, other suitable valve structures may also be used.

With reference to FIGS. 7-9 and 14, the bottom of the blow off valve base 184 preferably includes semi-circular holes 192 (FIGS. 9 and 14) with a flexible shim 194 covering the top of the holes on the inside of the blow off valve base 184. The flexible shim 194 is attached between the top of the blow off valve piston 180 and the bottom of the flange of the metering rod sleeve 73. This arrangement allows for fluid to return from the reservoir chamber 56 to the main shock body 40 (FIG. 6). The flexible shim 194, preferably, allows fluid to pass from the reservoir chamber 56 to the shaft 86 and restricts fluid flow in the opposite direction. The fluid flow direction and open position of the rebound valve 100 are illustrated in FIG. 14.

Figure 12:
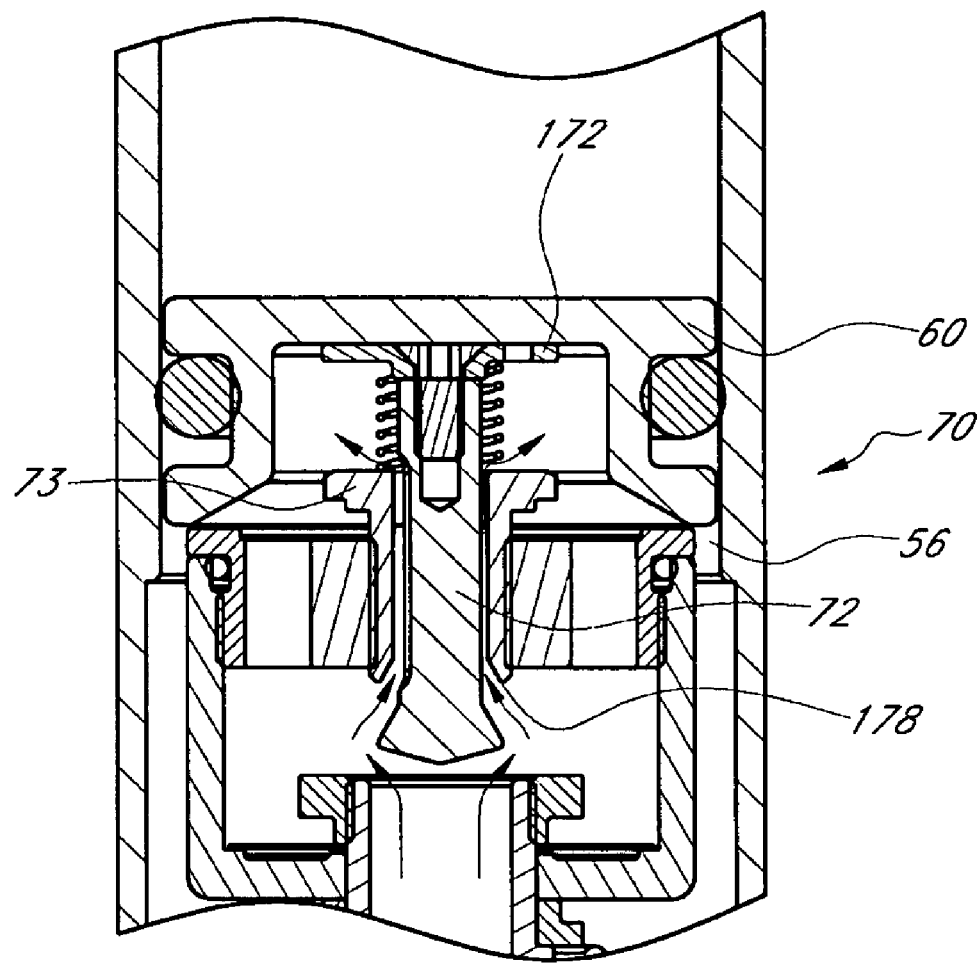
FIG. 12 is an enlarged cross-section view of the position sensitive valve in an open position.

In FIG. 12 the position sensitive valve 70 is shown in the open position. In this orientation, the floating piston 60 is in contact with the metering rod flange 172 to bias the metering rod 72 downward into an open position. Thus, fluid communication is permitted between the compression chamber 50 and the reservoir chamber 56. With the position sensitive valve assembly 70 in the open position, the fluid is able to bypass the inertia valve 80 and blow off valve 90 until the shock absorber 26 has reached the proper ride height or sag position and the position sensitive valve assembly 70 closes.

Figure 13:
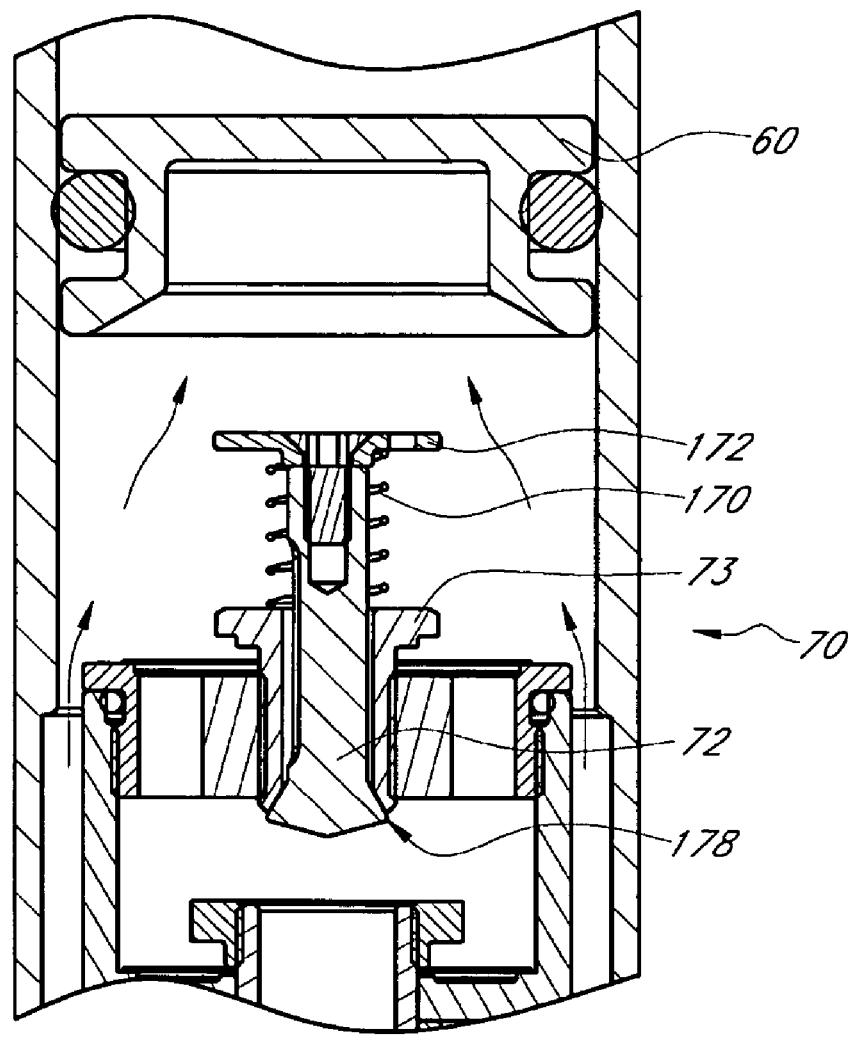
FIG. 13 is an enlarged cross-section view of the position sensitive valve in a closed position.

FIG. 13 illustrates a closed position of the position sensitive valve assembly 70. In this position the floating piston 60 is in an elevated position in which it is spaced from the upper surface of the metering rod flange 172. In this orientation of the position sensitive valve assembly 70, the metering valve 178 is in the closed position by the biasing force of the metering rod spring 170.

FIG. 14 illustrates the blow off valve 90 in the open position. In the illustrated orientation, the fluid in the shaft 86 (and compression chamber 50) has reached a relatively high pressure and this pressure causes the shim 180 to deflect away from the blow off piston 176. The fluid then flows from the shaft 86 and into the reservoir chamber 56. This scenario is likely caused by a large impact on the shock absorber 26. As described above, depending upon the impact force, the blow-off valve 90 may open in addition to one or both of the position sensitive valve 70 and the inertia valve. Alternatively, the blow-off valve 90 may be configured to open only at fluid pressures that would be likely to occur while the inertia valve 80 and the position sensitive valve 70 are both in the closed position.

Figure 15:
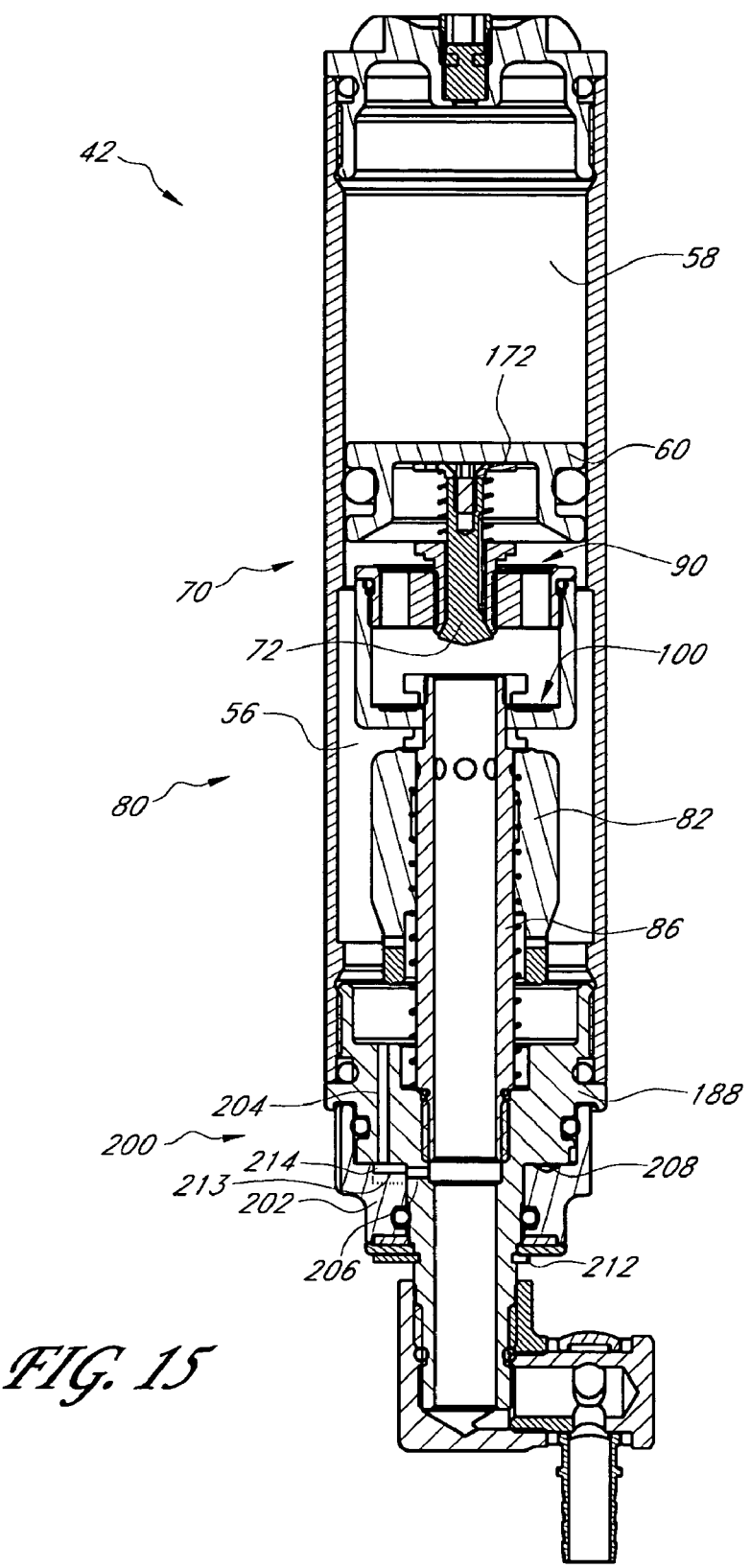
FIG. 15 is a cross-sectional view of a modification of the reservoir of the shock absorber of FIG. 6. The reservoir of FIG. 15 incorporates an externally adjustable bypass valve.

FIG. 15 illustrates another modification of reservoir 42 of the shock absorber 26 of FIGS. 1-4 and 5-14. In a number of respects, the reservoir 42 of FIG. 15 is substantially similar to the reservoir 42 of FIGS. 7-14. For convenience similar components will be referred to by the same reference numerals as the corresponding components of FIGS. 1-14. The illustrated reservoir 42 includes a floating piston 60 that partitions a gas chamber 58 from the damping fluid of the reservoir chamber 56, a position sensitive valve assembly 70, an inertia valve assembly 80, a blow off valve 90, and a rebound flow valve 100. The floating piston is in slidable and sealable engagement with the inside wall of the tube of reservoir 42. The inertia valve 80 is opened and closed by an inertia mass 82 that is preferably in slidable engagement with the shaft 86. The position sensitive valve is opened and closed by the movement of the floating piston 60.

The reservoir 42 of FIG. 15, however, also includes an additional flow circuit 200 in the lower portion of the reservoir 42 and, preferably, within the reservoir base 188. The circuit 200 bypasses or augments the other flow circuits of the reservoir 42, preferably including the position sensitive valve 70, the blow off valve 90, the rebound valve 100, and the inertia valve 80.

The circuit 200 preferably includes an adjustment knob 202 that is rotatable about the lower portion of the reservoir base 188. The adjustment knob 202 is secured in place relative to the base 188 by a suitable retention member, such as a cir-clip 212. The adjustment knob 202 includes a number of detents 208 which aid the user to locate the adjustment knob 202 into one of a number of easily locatable rotational positions. The adjustment knob 202 also includes a ramped surface 213, which defines a bottom wall of an inner cavity 214 between the base 188 and the knob 202. The adjustment knob 202 is configured so as to locate the ramped surface 213 of the cavity 214 to variably block the flow between a shaft port 206 and a reservoir base port 204.

The shaft port 206 extends radially from the inside of the lower portion of the shaft 86 to the cavity 214. The reservoir base port 204 extends axially from the cavity 214 to the reservoir chamber 56 through the reservoir base 188. The rotation of the adjustment knob positions the ramped surface 213 to move between various positions covering varying portions of the shaft port 206 and thus allows different amounts of fluid to flow out of the shaft port 206 and into the reservoir base port 204.

By adding this additional flow circuit 200 to the reservoir 42, the user is able to control, by the adjustment knob 202, the amount of influence the other valves in the reservoir 42 have on the compression and rebound characteristics of the shock absorber 26. For example if the user desires the shock absorber 26 to be greatly influenced by terrain forces, he/she could close this additional flow circuit by the adjustment knob 202 and urge the fluid to travel through the other valves in the reservoir including the inertia valve 80 and the position sensitive valve 70. If the user desires the shock absorber 26 to be less influenced by terrain forces, he/she could open this additional flow circuit by the adjustment knob 202 and allow the fluid to flow through the alternate flow circuit and partially bypass the other valves in the reservoir including the inertia valve 80 and the position sensitive valve 70. This example is used only to illustrate a possible scenario in which the additional flow circuit could be used and is not intended to limit the scope or intended use of the design modification.

In an alternative arrangement, the position sensitive valve 70 is configured to be adjustable to adjust the specific sag position of the shock absorber 26. One possibility is to configure the flange 172 of the metering rod 72 to be adjustable along the length of the metering rod 72 by an external adjustment knob (not shown). The adjustment knob (not shown) could be connected to an adjustment rod (not shown) which extends through a seal assembly on the top of the reservoir 42 and through a seal assembly in the center of the floating piston 60. The piston 60 is free to move along the longitudinal axis of the adjustment rod 204 and maintains a gas seal that separates the gas chamber 58 from the fluid in the reservoir chamber 56. The turning of the external adjustment knob would cause the distance between the flange 172 and the enlarged end 72a of the metering rod 72 to change. Thus, the turning of the knob would preferably change the ride height of the shock absorber 26 by changing the point at which the position sensitive valve 70 is permitted to move to the closed position by the floating piston 60.

Another possible way to have the position sensitive valve 70 adjustable is to adjust the volume of the reservoir chamber 56. By adjusting the volume in the reservoir chamber 56 one could adjust the corresponding position of the floating piston 60 to a compression or extension position of the shock absorber 26. This would in turn adjust the closing point of the position sensitive valve 70 relative to the compression or extension position of the shock absorber 26. This adjustability could be achieved in a variety of ways. One possible way this could be achieved is by making one end of the reservoir chamber 56, such as the reservoir base 188, adjustable by a threaded or ramped adjustment knob or lever. This altering of the height of the reservoir base 188 could achieve the aforementioned adjustability.

One advantage of having the position sensitive valve 70 externally adjustable is the user of the shock absorber 26 can compensate for different operating conditions of the vehicle. For example, in a bicycle application, a rider may have a particular preference regarding the ride height of the bicycle. This could be due to terrain conditions or variables in other components such as the frame or fork, which may influence the ride height of the bicycle.

Figure 18:
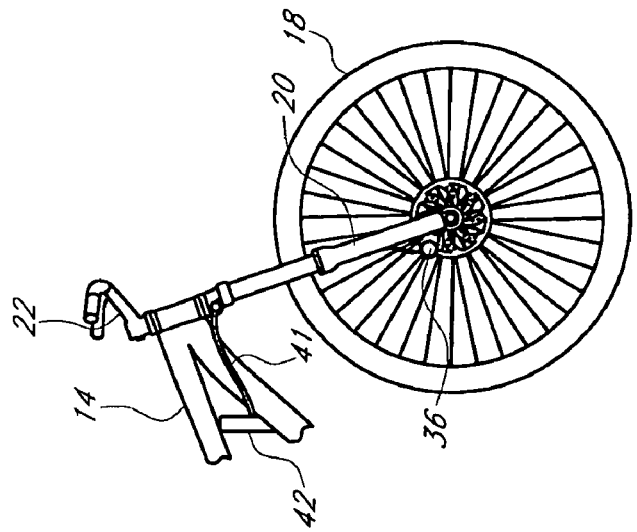
FIG. 18 illustrates yet another alternative position of the reservoir wherein the reservoir is mounted to the frame of the off-road bicycle and communicates with the front suspension via a tube.
Figure 17:
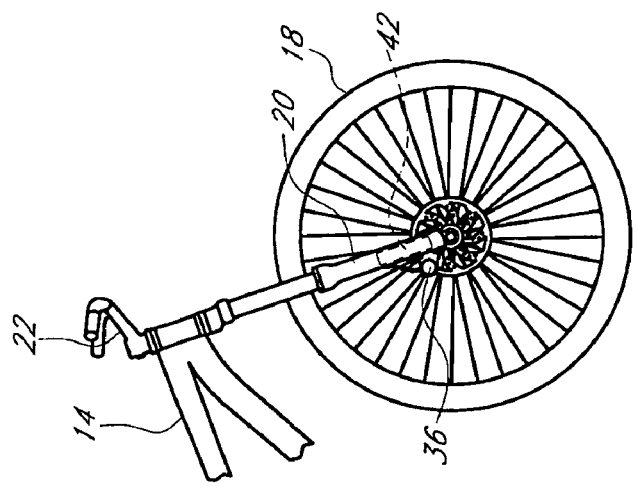
FIG. 17 illustrates an alternative position of the reservoir internal to the front suspension of the off-road bicycle.
Figure 16:
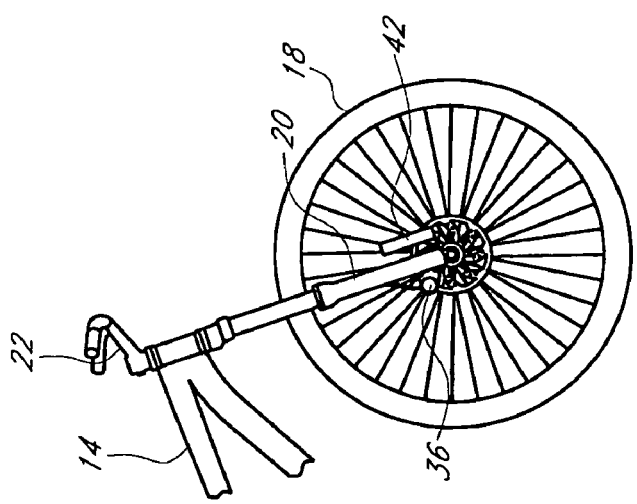
FIG. 16 illustrates an external reservoir, similar to the reservoir of FIGS. 6-15, incorporated into a front wheel suspension of an off-road bicycle.

Although the preferred embodiment of the shock absorber 26 illustrated in FIG. 1 and FIG. 5 are used with the rear wheel of a bicycle, in other preferred embodiments, it may also be incorporated into the front wheel of the bicycle. FIG. 16, FIG. 17 and FIG. 18 all illustrate alternative preferred embodiments of the position sensitive shock absorber in the form of a telescopic fork 20 with a reservoir 42 in various configurations.

FIG. 16 illustrates a front wheel suspension system of a bicycle. The illustrated front wheel suspension system uses telescopic, dual leg, fork 20. However, a single leg or linkage system may also be used as will be appreciated by one skilled in the art. A steerer tube (not shown) is journaled for limited rotation about a steering axis defined by the main frame 14. The fork 20 is secured to the main frame 14 by a handlebar assembly 22. The reservoir 42 is mounted to the lower fork leg of fork 20 and is in fluid communication with the hydraulic internals of the fork 20. This front suspension embodiment allows the use of the position sensitive shock reservoir 42 with a front wheel suspension system. The reservoir 42 may be capable of angular adjustment relative to the longitudinal axis of the fork 20 to permit adjustment of the sensitivity of an inertia valve 80 incorporated within the reservoir 42.

FIG. 17 illustrates a front wheel suspension system of a bicycle. The illustrated front wheel suspension system uses a telescopic dual leg fork 20. In the illustrated arrangement, the reservoir 42 is mounted inside one of the legs of fork 20 and is in fluid communication with the internal suspension hydraulics of the front wheel suspension. Although this particular embodiment illustrates the reservoir 42 in only one of the fork legs it may be used in both of the fork legs as will be appreciated by one skilled in the art.

FIG. 18 illustrates a front wheel suspension system of a bicycle. The illustrated front wheel suspension system uses telescopic dual leg fork 20. In this arrangement, the reservoir 42 is mounted on the main frame 14 of the bicycle and is in fluid communication with the front suspension system of the telescopic fork 20 by a flexible or semi-rigid tube or hose 41. This configuration allows the reservoir 42 to sense different terrain features experienced by the frame 14 and/or to be protected from potential damage.

Figure 19:
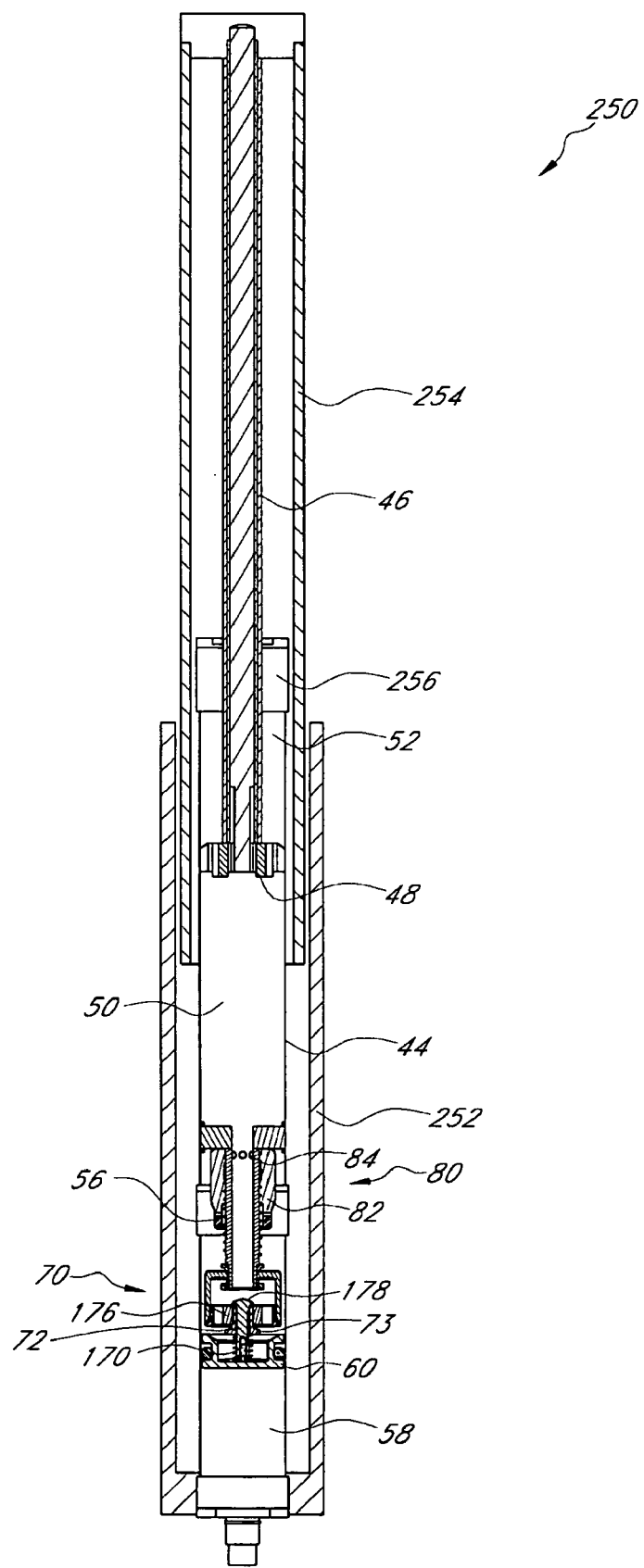
FIG. 19 is a cross-sectional view of a fork leg of a bicycle front wheel suspension system, including certain features, aspects and advantages of the present invention.

FIG. 19 illustrates one fork leg assembly 250 of the front suspension fork 20 of FIG. 1. For convenience similar structures will be referred to by the same reference numerals as used in FIGS. 1-18. The illustrated fork leg assembly 250 includes an outer tube or fork leg 252, and an inner tube or stanchion 254. The fork leg 252 and the stanchion 254 are telescopically engaged with one another for relative movement along a longitudinal axis of the fork leg assembly 250.

The illustrated fork leg assembly 250 includes a damper assembly 256 positioned within an internal space defined by the fork leg 252. The damper assembly 256 preferably is configured to provide a damping force that resists both compression movement and extension (or rebound) movement of the fork leg assembly 250. In addition, preferably the front suspension fork 20 includes a suspension spring (not shown) configured to produce a spring force tending to extend the fork leg assembly 250 and resist compression of the fork leg assembly 250 The suspension spring may be of any suitable construction, such as a coil spring or air spring arrangement, for example.

The damper assembly 256 preferably extends substantially the entire length of the fork leg assembly 250 and is coupled to both the fork leg 252 and the stanchion 254. The damper assembly 256 may be connected to the fork assembly 250 by any suitable connection. The illustrated damper assembly 256 includes a damper tube 44 and a piston rod 46. The piston rod 46 and damper tube 44 are telescopically engaged with one another. As described above, preferably the damper assembly 256 provides a damping force in response to both compression and extension movement.

As illustrated in FIG. 19, the piston rod 46 carries a damping piston 48 on its lower end within the damper tube 44. The damping piston 48 is in a substantially sealed, sliding engagement with an interior surface of the damper tube 44. Thus, the damping piston 48 divides the interior of the damper tube 44 into a first fluid chamber 52 above the damping piston 48 and a second fluid chamber 50 below the damping piston 48. The fluid chamber 50 reduces in volume in response to compression movement of the damper assembly 256 and is often referred to as the compression chamber. Similarly, the fluid chamber 52 reduces in volume in response to extension or rebound movement of the damper assembly 256 and is often referred to as the rebound chamber.

The damper assembly 256 also includes a gas chamber 58 which is configured to compensate for displacement of damping fluid within the damper tube 44 by an increasing volume of the piston rod 46 being present within the damper tube 44 as a result of compression of the damper assembly 256. Thus, as the piston rod 46 occupies an increasing volume of the damper tube 44 upon compression, the gas chamber 58 reduces in volume, thereby increasing the volume of the compression chamber 50 to accommodate fluid that cannot be displaced to the rebound chamber 52.

In the illustrated arrangement, the gas chamber 58 is bordered by a floating piston 60 which separates the compression chamber 50 from a gas chamber 58. The gas within the gas chamber 58 compresses such that the gas chamber 58 is able to reduce in volume to compensate for the damping fluid that cannot be displaced to the rebound chamber 52 during compression of the damper assembly 256. However, other suitable structures may also be employed, such as a bladder, for example.

A position sensitive valve 70 is substantially similar to the position sensitive valve 70 of FIG. 7-15 unless otherwise noted. The position sensitive valve 70 includes a biasing spring 170, a metering rod 72 with an enlarged end 72a, a metering valve 178 and a metering rod sleeve 73. The position sensitive valve 70 is preferably coupled to the center of a blow off piston 176. The position sensitive valve 70 is arranged so that the floating piston 60 will open and close the position sensitive valve 70 at a predetermined position. This position preferably corresponds with the ride height or sag position of the bicycle.

In the specific construction shown in FIG. 19, the fork leg 250 also includes an inertia valve 80, which includes an inertia mass 82 that selectively closes fluid ports 84 to inhibit or prevent fluid flow from the main shock body 40 to the reservoir chamber 56. Thus, when the inertia mass 82 of the inertia valve 80 is in a closed (upward) position, flow to the reservoir chamber 56 preferably is only possible through the position sensitive valve 70.

One advantage to this illustrated construction is that the fork leg 250 will preferably sag to a ride height before the inertia valve 80 takes effect and locks out (or substantially increases the damping force of the damper 256. This prevents the fork leg 250 from being locked out in a fully extended position which may not be the intended ride height of the associated bicycle.

As used herein in connection with a bicycle, the term shock absorber refers to a combination of a damper and suspension spring, as is customary in the industry. However, in other contexts, the term shock absorber may be synonymous with the term damper. A suspension assembly preferably includes a damper and may also include a suspension spring and/or other suspension components, such as linkage members, for example. As will be appreciated by one of skill in the art, the position sensitive valve assembly may be adapted for use in applications where shock absorbers are used other than bicycles, such as motorcycles, snowmobiles or automobiles, for example.

Although this invention has been disclosed in the context of a certain preferred embodiment and examples, it will be understood by those skilled in the art that the present invention extends beyond the specifically disclosed embodiments to other alternative embodiments and/or uses of the invention and obvious modifications and equivalents thereof. In particular, while the present position sensitive valve assembly for a suspension assembly has been described in the context of a particularly preferred embodiment, the skilled artisan will appreciate, in view of the present disclosure, that certain advantages, features and aspects of the suspension assembly may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A suspension damper, comprising:
   a piston rod carrying a piston;
   a tube defining a piston chamber, said piston configured for reciprocal movement within said piston chamber;
   a reservoir chamber defined by said damper;
   a divider that separates a gas chamber of said damper from said reservoir chamber, said divider configured to move to vary a volume of said reservoir chamber to accommodate fluid displaced from said piston chamber by said piston rod; and
   a flow passage connecting said piston chamber and said reservoir chamber;
   a first valve having a first position and a second position, wherein said first valve permits a first rate of fluid flow through said flow passage in said first position and wherein said first valve permits a second rate of fluid flow through said flow passage in said second position; and an inertia valve including an inertia mass, said inertia mass movable between an open position and a closed position, wherein, in said closed position, fluid flow through said inertia valve is substantially prevented and, wherein in said open position, fluid flow through said inertia valve is permitted;

wherein movement of said divider moves said first valve between said first position and said second position.

2. The damper of claim 1, wherein said divider is a floating piston.

3. The damper of claim 1, wherein said first valve comprises a valve body carried by said divider.

4. The damper of claim 1, wherein said divider defines at least a portion of a wall of said reservoir chamber of said damper.

5. The damper of claim 1, wherein said first valve and said divider are configured such that said first valve moves from said first position to said second position after a predetermined distance of compression of said damper from a fully extended position of said damper.

6. The damper of claim 1, wherein said second rate of flow is substantially zero flow.

7. The damper of claim 1, wherein said second rate of flow is a bleed flow rate which permits compression of said damper when said first valve is in said second position.

8. The damper of claim 1, wherein said inertia mass is in sliding engagement with a shaft defining a plurality of fluid ports which are blocked by said inertia mass in said closed position, wherein said inertia mass and said shaft cooperate to define an annular fluid space therebetween which is in fluid communication with each of said plurality of fluid ports.

9. The damper of claim 8, wherein a width of said annular fluid space is less than a diameter of said plurality of fluid ports.

10. The damper of claim 1, additionally comprising a bypass valve configured to permit fluid flow between said piston chamber and said reservoir chamber.

11. The damper of claim 10, wherein said bypass valve is externally adjustable to permit a flow rate through said bypass valve to be adjusted by a user of said damper.

12. The damper of claim 1, wherein said reservoir chamber is defined by a reservoir tube located remotely from said tube defining said piston chamber, and a tube defining a fluid passage between said reservoir chamber and said piston chamber.

13. The damper of claim 1, in combination with a suspension spring configured to apply a force to said damper tending to extend said piston rod relative to said tube.

14. The damper of claim 13, wherein said damper and said suspension spring are operably connected between one of a front wheel and a rear wheel of a bicycle and a frame of said bicycle.

15. The damper of claim 1, wherein said damper is contained within a front suspension fork of a bicycle.

16. A suspension damper, comprising:
a tube;
a piston rod carrying a piston for reciprocal movement within said tube, said piston and said tube defining a first fluid chamber;
a second fluid chamber defined by said damper, wherein a wall that defines a portion of said second fluid chamber is movable to allow a variation in a volume of said second fluid chamber, wherein said wall is defined by a divider that separates a gas chamber of said damper from said second fluid chamber;

a first valve configured to move between a first position and a second position in response to movement of said wall in a direction resulting from an increase in volume of fluid within said second chamber;

a second valve configured to move between a first position and a second position in response to an acceleration force applied to said damper;

said damper in combination with a suspension spring configured to apply a force to said damper tending to extend said piston rod relative to said tube.

17. The damper of claim 16, wherein said second chamber is a reservoir chamber defined by a reservoir tube located remotely from said tube defining said first chamber, and a tube defining a fluid passage between said reservoir chamber and said first chamber.

18. The damper of claim 16, wherein said second chamber is a reservoir chamber defined by a reservoir tube which is structurally coupled to said tube defining said first fluid chamber.

19. The damper of claim 16, wherein said second chamber is a reservoir chamber defined by said tube.

20. The damper of claim 16, wherein said first valve is configured to move from said first position to said second position after a predetermined distance of compression of said damper from a fully extended position of said damper.

21. The damper of claim 16, wherein said first position of said first valve is an open position which permits fluid flow through said valve and said second position of said first valve is a closed position which permits substantially zero flow through said first valve.

22. The damper of claim 16, wherein said second valve is an inertia valve comprising an inertia mass movable between an open position and a closed position, wherein, in said closed position, fluid flow through said inertia valve is substantially prevented and, wherein in said open position, fluid flow through said inertia valve is permitted.

23. The damper of claim 22, wherein said inertia mass is in sliding engagement with a shaft defining a plurality of fluid ports which are blocked by said inertia mass in said closed position, wherein said inertia mass and said shaft cooperate to define an annular fluid space therebetween which is in fluid communication with each of said plurality of fluid ports.

24. The damper of claim 23, wherein a width of said annular fluid space is less than a diameter of said plurality of fluid ports.

25. The damper of claim 16, additionally comprising a bypass valve configured to permit fluid flow between said first fluid chamber and said second fluid chamber.

26. The damper of claim 25, wherein said bypass valve is externally adjustable to permit a flow rate through said bypass valve to be adjusted by a user of said damper.

27. The damper of claim 16, wherein said damper and said suspension spring are operably connected between one of a front wheel and a rear wheel of a bicycle and a frame of said bicycle.

28. The damper of claim 16, wherein said damper is contained within a front suspension fork of a bicycle.

29. A suspension damper, comprising:
a tube;
a piston rod carrying a piston for reciprocal movement within said tube;
a first valve wherein a position of said first valve is determined by a relative position between said tube and said piston rod, said first valve positioned in an open position when said damper is in a substantially fully extended position, said first valve configured to remain in said open position to permit said damper to move from said substantially fully extended position to a sag position that is between about 5% and 40% of the total compression travel of said damper, wherein said first valve moves to a closed position once said damper has reached said sag position and wherein fluid pressure created by a compression force applied to said damper tends to maintain said first valve in said closed position;

a second valve, normally biased to a closed position, and movable to an open position to permit said damper to move from said sag position to a further compressed position.

30. The damper of claim 29, wherein said first valve remains closed while said damper is compressed from said sag position to said further compressed position.

31. The damper of claim 29, wherein said second valve is an inertia valve.

32. The damper of claim 29, wherein said damper includes a reservoir chamber defined by said damper.

33. The damper of claim 32, wherein a divider is configured to move to vary a volume of said reservoir chamber to accommodate fluid displaced by said piston rod.

34. The damper of claim 33, wherein movement of said divider moves said first valve between said open position and said closed position.

* * * * *